(12) United States Patent
Oldroyd et al.

(10) Patent No.: US 10,557,267 B2
(45) Date of Patent: Feb. 11, 2020

(54) TRUSS STRUCTURE

(71) Applicant: ISOTRUSS INDUSTRIES LLC, Provo, UT (US)

(72) Inventors: Jordan W. Oldroyd, Provo, UT (US); Jonathan J. Curtis, Provo, UT (US); Carter J. Smith, Orem, UT (US); Nathan D. Rich, Orem, UT (US); David W. Jensen, Mapleton, UT (US)

(73) Assignee: Isotruss Industries LLC, Provo, UT (US)

( * ) Notice: Subject to any disclaimer, the term of this patent is extended or adjusted under 35 U.S.C. 154(b) by 0 days.

(21) Appl. No.: 15/913,836

(22) Filed: Mar. 6, 2018

(65) Prior Publication Data

US 2018/0251980 A1 Sep. 6, 2018

Related U.S. Application Data

(60) Provisional application No. 62/467,656, filed on Mar. 6, 2017.

(51) Int. Cl.
*E04C 3/28* (2006.01)
*E04C 3/08* (2006.01)
(Continued)

(52) U.S. Cl.
CPC ............. *E04C 3/28* (2013.01); *B29C 70/24* (2013.01); *B29C 70/54* (2013.01); *E04B 1/19* (2013.01);
(Continued)

(58) Field of Classification Search
CPC ... E04C 3/28; E04C 3/285; E04C 3/29; E04C 3/08; E04C 2003/0447; E04C 2003/0486;
(Continued)

(56) References Cited

U.S. PATENT DOCUMENTS

| 1,465,307 A | 8/1923 | Keogan |
| 1,613,788 A | 1/1927 | Dawson et al. |

(Continued)

FOREIGN PATENT DOCUMENTS

| FR | 1377290 A | 11/1964 |
| GB | 1251343 | 10/1971 |

(Continued)

OTHER PUBLICATIONS

Asay: "Bending Behavior of Carbon/Epoxy Composite IsoBeam Structures," Thesis, Mar. 8, 2016, 257 pages.
(Continued)

*Primary Examiner* — Joshua K Ihezie
(74) *Attorney, Agent, or Firm* — Brake Hughes Bellermann LLP

(57) ABSTRACT

A truss structure may include a plurality of load bearing members, or force members, that are joined at a plurality of nodes to define a load bearing structure. The truss structure may include a plurality of longitudinal members extending in parallel along a longitudinal length of the truss structure, and a plurality of transverse members, joined to the plurality of longitudinal members at nodes, and extending between the plurality of longitudinal members. The plurality of transverse members may provide buckling support to the plurality of longitudinal members, so that an axial load, or compressive load, or buckling load, may be effectively carried by the truss structure.

12 Claims, 24 Drawing Sheets

(51) Int. Cl.
*E04B 1/19* (2006.01)
*E04C 3/29* (2006.01)
*B29C 70/24* (2006.01)
*B29C 70/54* (2006.01)
*E04C 3/04* (2006.01)
*B29K 63/00* (2006.01)
*B29K 307/04* (2006.01)
*B29L 31/10* (2006.01)

(52) U.S. Cl.
CPC ............... *E04C 3/08* (2013.01); *E04C 3/29* (2013.01); *B29K 2063/00* (2013.01); *B29K 2307/04* (2013.01); *B29L 2031/10* (2013.01); *E04B 2001/1933* (2013.01); *E04C 2003/0443* (2013.01); *E04C 2003/0486* (2013.01); *E04C 2003/0495* (2013.01)

(58) Field of Classification Search
CPC ..... E04C 2003/0495; E04C 2003/0443; B29C 70/24; B29C 70/54; E04B 1/19; E04B 2001/1933; B29K 2307/04; B29K 2063/00; B29L 2031/10
See application file for complete search history.

(56) References Cited

U.S. PATENT DOCUMENTS

| | | |
|---|---|---|
| 1,798,064 A | 3/1931 | Chorlton et al. |
| 1,922,269 A | 8/1933 | Wickwire, Jr. |
| 2,106,674 A | 1/1938 | Busch |
| 2,158,266 A | 5/1939 | Aldrich |
| 2,362,688 A | 11/1944 | Dunn |
| 2,879,687 A | 3/1959 | Leimbach et al. |
| 2,931,467 A | 4/1960 | Fentiman |
| 2,941,440 A | 6/1960 | Scanlon |
| 3,007,497 A | 11/1961 | Shobert |
| 3,062,336 A | 11/1962 | Baxter |
| 3,495,687 A | 2/1970 | Shirley, Jr. et al. |
| 3,496,687 A | 2/1970 | Greenberg et al. |
| 3,501,880 A | 3/1970 | Bosch |
| 3,705,473 A | 12/1972 | Yeffal-Rueda |
| 3,798,864 A * | 3/1974 | Georgii ............ E04C 5/065 52/223.14 |
| 3,800,414 A | 4/1974 | Shattes et al. |
| 3,970,116 A | 7/1976 | Takada et al. |
| 3,992,118 A | 11/1976 | Siegers |
| 4,077,828 A | 3/1978 | Strom |
| 4,109,038 A | 8/1978 | Hayashi et al. |
| 4,137,354 A | 1/1979 | Mayes, Jr. et al. |
| 4,241,117 A | 12/1980 | Figge |
| 4,253,284 A | 3/1981 | Bliss |
| 4,260,143 A | 4/1981 | Kliger |
| 4,321,854 A | 3/1982 | Foote et al. |
| 4,337,560 A * | 7/1982 | Slysh ............ B64G 9/00 29/450 |
| 4,347,287 A | 8/1982 | Lewis et al. |
| 4,366,658 A | 1/1983 | Maistre |
| 4,380,483 A | 4/1983 | Kliger |
| 4,471,548 A * | 9/1984 | Goudie ............ E04H 12/182 40/610 |
| 4,473,217 A | 9/1984 | Hashimoto |
| 4,475,232 A | 10/1984 | Shaw |
| 4,475,323 A | 10/1984 | Schwartzberg et al. |
| 4,494,436 A | 1/1985 | Kruesi |
| 4,539,786 A * | 9/1985 | Nelson ............ B64G 9/00 244/159.5 |
| 4,557,097 A | 12/1985 | Mikulas, Jr. et al. |
| 4,655,022 A * | 4/1987 | Natori ............ B64G 9/00 52/108 |
| 4,686,134 A | 8/1987 | Ono |
| 4,722,162 A * | 2/1988 | Wilensky ............ B64G 9/00 52/652.1 |
| 4,734,146 A | 3/1988 | Halcomb et al. |
| 4,786,341 A | 11/1988 | Kobatake et al. |
| 4,803,824 A | 2/1989 | Coppa |
| 4,912,889 A * | 4/1990 | Palumbo ............ E04B 1/19 362/145 |
| 4,916,997 A | 4/1990 | Spain |
| 4,951,440 A | 8/1990 | Staeger |
| 4,986,863 A | 1/1991 | Denoel et al. |
| 5,003,736 A | 4/1991 | Okazaki et al. |
| 5,016,516 A | 5/1991 | Aldrich et al. |
| 5,048,441 A | 9/1991 | Quigley |
| 5,152,326 A | 10/1992 | Vohringer |
| 5,184,444 A * | 2/1993 | Warden ............ B64G 9/00 52/108 |
| 5,197,254 A | 3/1993 | Smith |
| 5,320,696 A | 6/1994 | McConnell et al. |
| 5,356,234 A | 10/1994 | Vangool |
| 5,388,538 A | 2/1995 | Chekroune et al. |
| 5,463,970 A | 11/1995 | Hartlmeier et al. |
| 5,505,035 A * | 4/1996 | Lalvani ............ A63B 9/00 52/311.2 |
| 5,556,677 A | 9/1996 | Quigley et al. |
| 5,651,228 A | 7/1997 | Zeigler |
| 5,846,364 A | 12/1998 | Policelli |
| 5,921,048 A * | 7/1999 | Francom ............ E04C 3/08 242/437.3 |
| 5,962,150 A | 10/1999 | Priluck |
| 5,985,304 A | 11/1999 | Van Voris et al. |
| 6,076,324 A | 6/2000 | Daily et al. |
| 6,264,684 B1 | 7/2001 | Banas et al. |
| 6,321,502 B1 | 11/2001 | Castano |
| 6,431,497 B1 | 8/2002 | Hoyt et al. |
| 6,439,096 B1 | 8/2002 | Mungalov et al. |
| 6,647,852 B1 | 11/2003 | Freitas et al. |
| 6,910,308 B2 * | 6/2005 | Cadogan ............ E04H 15/20 52/646 |
| 7,132,027 B2 * | 11/2006 | Jensen ............ B29C 53/564 156/175 |
| 7,155,872 B2 * | 1/2007 | Francom ............ E04C 3/08 52/648.1 |
| 7,318,303 B1 | 1/2008 | Kling |
| 7,694,465 B2 * | 4/2010 | Pryor ............ E04C 3/005 138/119 |
| 7,694,486 B2 * | 4/2010 | Murphy ............ B64G 1/222 52/645 |
| 8,042,305 B2 * | 10/2011 | Pryor ............ B64G 1/222 244/159.4 |
| 8,320,727 B1 * | 11/2012 | Jacobsen ......... B29D 11/00663 385/129 |
| 8,444,900 B2 * | 5/2013 | Wilson ............ B29C 33/42 264/258 |
| 8,621,822 B2 | 1/2014 | Brockwell |
| 8,745,958 B2 * | 6/2014 | Kang ............ B21F 27/128 52/652.1 |
| 9,116,428 B1 * | 8/2015 | Jacobsen ............ G03F 7/09 |
| 2002/0081936 A1 * | 6/2002 | Snelson ............ A63H 33/10 446/111 |
| 2002/0124518 A1 * | 9/2002 | Warren ............ B64G 1/222 52/646 |
| 2004/0247866 A1 | 12/2004 | Jensen |
| 2005/0115186 A1 * | 6/2005 | Jensen ............ A45F 3/04 52/633 |
| 2007/0095012 A1 * | 5/2007 | Kang ............ B21F 27/12 52/750 |
| 2007/0151202 A1 * | 7/2007 | Cox ............ A61L 27/446 52/750 |
| 2010/0071300 A1 * | 3/2010 | Kang ............ B21F 3/02 52/646 |
| 2011/0117315 A1 * | 5/2011 | Kang ............ B21F 27/12 428/112 |
| 2012/0151868 A1 * | 6/2012 | Kang ............ B21F 27/128 52/649.1 |
| 2012/0225237 A1 | 9/2012 | Brockwell |
| 2013/0080123 A1 * | 3/2013 | Webbink ............ G06F 17/5009 703/1 |
| 2013/0167462 A1 * | 7/2013 | Wilson ............ B29C 33/42 52/309.16 |

(56) References Cited

U.S. PATENT DOCUMENTS

| | | | |
|---|---|---|---|
| 2013/0243989 A1* | 9/2013 | Ridges | B29C 53/566 428/36.91 |
| 2013/0276308 A1* | 10/2013 | Kang | B21F 27/12 29/897 |
| 2013/0322955 A1* | 12/2013 | Ma | E04B 1/1903 403/53 |
| 2014/0182232 A1* | 7/2014 | Holt | B29C 70/56 52/645 |
| 2014/0288650 A1* | 9/2014 | Hunt | A61F 2/447 623/16.11 |
| 2014/0302261 A1* | 10/2014 | Cheung | B32B 3/06 428/33 |
| 2017/0100855 A1 | 4/2017 | Taylor | |
| 2017/0173894 A1* | 6/2017 | Konrad | B29C 45/14065 |
| 2017/0306923 A1* | 10/2017 | Berthilsson | F03D 1/06 |

FOREIGN PATENT DOCUMENTS

| | | |
|---|---|---|
| GB | 2049613 A | 12/1980 |
| GB | 2164674 A | 3/1986 |
| JP | 59-55946 A | 3/1984 |
| JP | S6215695 B2 | 4/1987 |
| WO | 98/45556 A1 | 10/1998 |
| WO | 02/10535 A2 | 2/2002 |

OTHER PUBLICATIONS

Hinds: "Shear-Dominated Bending Behavior of Carbon/Epoxy Composite Lattice IsoBeam Structures"; Thesis, Apr. 11, 2016, 161 pages.
37th AIAA/ASME/ASCE/AHS/ASC Structures, Structural Dynamics, and Materials Conference, Apr. 15-17, 1996, Salt Lake City, Utah, U.S.A., pp. 1868-1873.
AGARD Conference Proceedings 531, Smart Structures for Aircraft and Spacecraft, Oct. 5-7, 1992, Lindau, Germany, 389 pages.
Wada et al.: First Joint U.S./Japan Conference on Adaptive Structures, Nov. 13-15, 1990, Maui, Hawaii, U.S.A., Technomic Publishing Co., Inc.
Matsuzaki et al.: Second Joint Japan/U.S. Conference on Adaptive Structures, Nov. 12-14, 1991, Nagoya, Japan, Technomic Publishing Co., Inc., 21 pages.
Allen, J. J. et al., "The Sandia Structural Control Experiments" Sandia National Laboratories, Albuquerque, New Mexico, pp. 928-951 presented at the First Joint US/ Japan Conference on Adaptive Structures Nov. 13-15, 1990.
Anderson, W.W. et al., The NASA-LaRC Controls-Structure Interaction Technology Program Guidance and Control Division, NASA, Hampton, Virginia, pp. 15-31, presented at the Second Joint US/ Japan Conference on Adaptive Structures Nov. 12-14, 1991.
Beer, F. et al. "Space Trusses"; Vector Mechanics for Engineers Statics Third Edition, pp. 222-228, 1977.
Betti, F. et al., "On Possible Applications of Smart Structures to Control of Space Systems" AGARD Conference proceedings 531 Smart Structures for Aircraft and Spacecraft held in Germany, Oct. 1992, pp. 26-1 to 26-14.
Breitbach, E. J., "Research Status on Adaptive Structures in Europe" Institute of Aeroelasticity, Goettingen, Germany, pp. 32-48, presented at the Second Joint USI Japan Conference on Adaptive Structures Nov. 12-14, 1991.
Bronowicki, A.J. et al., "ACESA Structural Control System Design" TRW Space and Technology Group, Redondo Beach, California, pp. 373-401 presented at the First Joint US/ Japan Conference on Adapative Structures Nov. 13-15, 1990.
Chen, G.S. et at., "On an Adaptive Truss Manipulator Space Crane Concept" Jet Propulsion Laboratory, California Institute of Technology, Pasadena, California, pp. 726-742, presented at the First Joint US/ Japan Conference on Adaptive Structures Nov. 13-15, 1990.

Crawley, Edward et al., "Intelligent Structures a Technology Overview and Assessment": AGARD Conference proceedings 531 Smart Structures for Aircraft and Spacecraft held in Germany, Oct. 1992, Space Engineering Research Center, MIT, pp. 6-1 to 6-16, Cambridge, Massachusetts, USA.
Darooka et al, "Advanced Space Structure Concepts and Their Development", American Institute of Aeronautics and Astronautics, Structures, Structural Dynamics, and Materials Conference and Exhibit, 42nd Seattle Washington, Apr. 16-19, 2001, pp. 1-10.
Das, Alok et al., "Adaptive Structures for Spacecraft a USAF Perspective" AGARD Conference proceedings 531 Smart Structures for Aircraft and Spacecraft held in Germany, Oct. 1992 pp. 3-1 to 3-3-13.
Das, SK et al., "A Mathematical Basis for the Design and Design Optimization of Adaptive Trusses in Precision Control" Duke University, Durham North Carolina, pp. 660-690 presented at the First Joint US/ Japan Conference on Adaptive Structures Nov. 13-15, 1990.
D'Eleuterio, G. M. T., "Articulational Dynamics of Variable-Geometry Truss Structures" Institute for Aerospace Studies, University of Toronto, Downsview, Ontario, Canada, pp. 621-640, presented at the Second Joint US/ Japan conference on Adaptive Structures Nov. 12-14, 1991.
Fanson, J.L. et al., "Damping and Structural Control of the JPL Phase 0 Testbed Structure" Jet Propulsion Laboratory California Institute of Technology, Pasadena, California pp. 510-524 presented at the First Joint US/ Japan Conference on Adaptive Structures Nov. 13-15, 1990.
Fiber Innovations, Inc. "Braided Composite Structures", 6 pages.
Fiber Innovations, Inc. Brochure, 4 pages.
Fisher, S., "Real-Time Modifications of an Orbiting Spacecraft to Excite Vibrations Observed by a Ground-Based Laser Radar" Naval Research Laboratory, Washington, D.C., pp. 479-492, presented at the Second Joint US/ Japan conference on Adaptive Structures Nov. 12-14, 1991.
Hibbeler, RC: "Space Trusses" Engineering Mechanics Statics, Chapter 6, Seventh Edition, pp. 267-270, Prentice-Hall, Englewood Cliffs, New Jersey, 1995.
Hughes, P.C., "Trussarm—A Variable-Geometry-Truss Manipulator"University of Toronto, Institute for Aerospace Studies, Toronto, Canada, pp. 715-725 presented at the First Joint US/ Japan Conference on Adaptive Structures Nov. 13-15, 1990.
Jensen, D. W. et al., "Dynamic Characterization of a Composite Lattice Structure with an Integrated Fiber-Optic Strain Sensor" The Pennsylvania State University, Department of Aerospace Engineering, University Park, Pennsylvania, pp. 328-845, presented at the First Joint US/ Japan Conference on Adaptive Structures Nov. 13-15, 1990.
Jensen, D. W. et al. "On the Structural Efficiency of Three-Dimensional Isogrid Designs"; $37^{th}$ AIAA/ASME/ASCE/AHS/ASC Structures, Structural Dynamics, and Materials Conference; Apr 15-17, 1996.
Jensen, W. D. et al., "Validation of Active Strain Measurements in Composites Using Mach-Zehnder Interferometry with Embedded Optical Fibers" The Pennsylvania State University, Department of Aerospace Engineering, University Park, Pennsylvania, pp. 771-788, presented at the Second Joint US/ Japan Conference on Adaptive Structures Nov. 12-14, 1991.
Kuo, C.P. et al., "Optimal Acutator Placement on an Active Reflector Using a Modified Simulated Annealing Technique" Applied Mechanics Technologies Section, Jet Propulsion Laboratory, California Institute of Technology, Pasadena, California, pp. 1056-1068 presented at the First Joint US/ Japan Conference on Adaptive Structures Nov. 13-15, 1990.
Kuwao, F. et al., "Quasi-Static Shape Estimation and Control of Adaptive Truss Structures Using Internal Displacement Structures" Applied mechanics Technologies Section, Jet Propulsion laboratory, California Institute of Technology, Pasadena, California, pp. 375-392, presented at the Second Joint US/ Japan Conference on Adaptive Structures Nov. 12-14, 1991.
Larson, L. B. et al., "An Experimental 10-Meter Space Truss with Tendon Control" School of Civil and Environmental Engineering,

(56) References Cited

OTHER PUBLICATIONS

Cornell University Ithaca, New York, pp. 227-244, presented at the Second Joint US/ Japan Conference on Adaptive Structures Nov. 12-14, 1991.
Lawrence, C.R. et al., "Active Member Vibration Control Experiment in a KC-135 Reduced Gravity Environment" Jet Propulsion Laboratory, California Institute of Technology, Pasadena, California, pp. 987-1003 presented at the First Joint US/ Japan Conference on Adaptive Structures Nov. 13-15, 1990.
Maclean, B.J. et al., "Development of a Shape Memory Material Actuator for Adaptive Truss Applications" Materials and Structures Group Research & Technology, Martin Marietta Space Systems Denver, Colorado, pp. 1038-1055 presented at the First Joint US/ Japan Conference on Adaptive Structures Nov. 13-15, 1990.
Matsuzaki, Y. et al., "Application of Fuzzy Control to Computer Simulation of Tracking and Rendezvous Test for Docking of an Adaptive Space Structure" Department of Aerospace Engineering, Nagoya University, Chikusa, Nagoya, Japan, pp. 641-652, presented at the Second Joint US/ Japan Conference on Adaptive Structures Nov. 12-14, 1991.
Matsuzaki, Y. et al., "Application of Fuzzy Control to Tracking for Docking Operation of an Adaptive Space Structure" Department of Aerospace Engineering, Nagoya university, Chikusa, Nagoya Japan, pp. 792-806 presented at the First Joint US/ Japan Conference on Adaptive Structures Nov. 13-15, 1990.
Miura, K. et al., "Aerospace Research Status on Adaptive Structures in Japan" Institute of Space and Astronautical Sciences, Yoshinodai, Sagamihara, Japan, pp. 3-14, presented at the Second Joint US/ Japan Conference on Adaptive Structures Nov. 12-14, 1991.
Mobrem, M. et al., "Control Design of Space Station Mobile Transporter with Multiple Constraints" Astro Aerospace Corporation, Carpentaria, California pp. 87-116 presented at the First Joint US/Japan Conference on Adaptive Structures Nov. 13-15, 1990.
Modi, V.J. et al., "Formulation for a Class of Adaptive Structures with Applications" Department of Mechanical Engineering, The University of British Columbia, Vancouver, British Columbia, Canada, pp. 92-110, presented at the Second Joint US/ Japan Conference on Adaptive Structures Nov. 12-14, 1991.
Murotsu, Y. et al., "Optical Configuration Control of an Intelligent Truss Structure" Department of Aeronautical Engineering, College of Engineering, University o f Osaka Prefecture, Sakai, Osaka Japan, pp. 157-175 presented at the First Joint US/ Japan Conference on Adaptive Structures Nov. 13-15, 1990.
Murotsu, Y. et al., "Some Approaches to the Optimal Adaptive Geometries of Intelligent Truss Structures" University of Osaka Prefectures, Sakai, Osaka, Japan, pp. 743-771, presented at the First Joint US/ Japan Conference on Adaptive Structures Nov. 13-15, 1990.
Murotsu, Y. et al., "PD-Impedance Control of Docking Mechanism Composed of Intelligent Adaptive Structure" Department of Aeronautical Engineering, College of Engineering, University of Osaka Prefecture, Sakai, Osaka, Japan, pp. 653-669, presented at the Second Joint US/ Japan Conference on Adaptive Structures Nov. 12-14, 1991.
Naccarato, F. et al., "Redundancy Resolution in Variable-Geometry Truss Manipulators Using Reference Shape Curves" Institute for Aerospace Studies, University of Toronto, Downsview, Ontario, Canada, pp. 539-555, presented at the Second Joint US/ Japan Conference on Adaptive Structures Nov. 12-14, 1991.
Natori, M.C. et al., "Application of Adaptive Structure Concepts to Construction of space Systems in Orbit-Concepts and Formulation" Institute of Space and Astronautical Science Sagamihara, Japan pp. 77-91, presented at the Second Joint US/ Japan Conference on Adaptive Structures Nov. 12-14, 1991.
Pai, S.S. et al., "Probabilistic Structural Analysis of Adaptive/Smart/Intelligent Space Structures" National Aeronautics and Space Administration, Lewis Research Center, Cleveland, Ohio, pp. 419-433, presented at the Second Joint US/ Japan Conference on Adaptive Structures Nov. 12-14, 1991.

Seguchi, Y., "Criteria-Oriented Configuration Control of Adaptive Structure and its Modular Neural Network Representation" Department of Mechanical Engineering, Osaka University Toyonaka, Osaka Japan, pp. 402-421 presented at the First Joint US/ Japan Conference on Adaptive Structures Nov. 13-15, 1990.
Shibuta, S. et al., "Adaptive Control of Space Truss Structures by Piezoelectric Actuator" National Space Development Agency of Japan Tsukuba Space Center, Ibaraki, Japan, pp. 245-262, presented at the Second Joint US/ Japan Conference on Adaptive Structures Nov. 12-14, 1991.
Sirlin, S. W. et al., "Active Structural Control for Damping Augmentation and Compensation of Thermal Distortion" Jet Propulsion Laboratory, California Insititute of Technology, Pasadena, California, pp. 434-444, presented at the Second Joint US/ Japan Conference on Adaptive Structures Nov. 12-14, 1991.
Sirlin, S.W. et al., "Sizing of Active Piezoelectric Struts for Vibration Suppression on a Space-Based Interferometer" Jet Propulsion Laboratory California Institute of Technology, Pasadena, California pp. 47-63, 1991.
Stover, D., "Braiding and RTM Succeed in Aircraft Primary Structures", Advanced Composites May/Jun. 1989, 4 pages.
Swanson, A. D. et al., "Zero-Gravity Dynamics of Space Structures in Parabolic Aircraft Flight" flight dynamics laboratory, air force Wright research and development center ,Wright-Patterson Air Force Base, Ohio, pp. 952-965 presented at the First Joint US/ Japan Conference on Adaptive Structures Nov. 13-15, 1990.
Tabata, M. et al., "Shape Adjustment of a Flexible space Antenna Reflector": Mitsubishi Electric Corporation, Center Research Laboratory, Hyogo, Japan, pp. 393-405, presented at the Second Joint US/ Japan Conference on Adaptive Structures Nov. 12-14, 1991.
Tanaka, M. et al., "On Damping Enhancement of LSS Coupled with the Antenna Pointing System" Toshiba Corporation, Kawasaki, Japan, pp. 510-524 presented at the First Joint US/ Japan Conference on Adaptive Structures Nov. 13-15, 1990.
Tanaka, M. et al., "Stochastic Approach to Static Control of Adaptive Truss under Imperfection of Adjustable Member Lengths"Department of Mechanical Engineering, Osaka University, Osaka, Japan, pp. 406-418, presented at the Second Joint US/ Japan Conference on Adaptive Structures Nov. 12-14, 1991.
Tanaka, M. et al., Kinematics of Adapative Truss Permitting Modal Offset (configuration and workspace reach), Osaka university, Department of Mechanical engineering, Osaka, Japan, pp. 691-714, presented at the First Joint US/ Japan conference on Adaptive Structures Nov. 13-15, 1990.
Tidwell, PH et al., "Kinematic Analysis of Generalized Adaptive Trusses" Mechanical Engineering Department, Virginia Polytechnic Institute and State University, Blacksburg, Virginia, pp. 772-791 presented at the First Joint US/ Japan Conference on Adaptive Structures Nov. 13-15, 1990.
Troidl H. et al., "Dynamic Tests on the NASA Langley CSI Evolutionary Model" AGARD Conference proceedings 531 Smart Structures for Aircraft and Spacecraft held in Germany, Oct. 1992, pp. 4-1 to 4-9.
Wada, B. K. et al., "Application of Adaptive Structures for the Control of Truss Structures" Jet Propulsion Laboratory, California Institute of Technology Pasadena, California, pp. 123-131, presented at the Second Joint US/ Japan Conference on Adaptive Structures Nov. 12-14, 1991.
Wada, Ben K. et al., "Advances in Adaptive Structures at Jet Propulsion Laboratory" AGARD Conference proceedings 531 Smart Structures for Aircraft and Spacecraft held in Germany, Oct. 1992, Applied Mechanics Technologies Section, pp. 28-1 to 28-13, Pasadena, California, USA.
Yokoi, K et al., "A Method for Solving Inverse Kinematics of Variable Structure Truss Arm with High Redundancy" Robotics Department, Mechanical Engineering Laboratory, Tsukuba, Ibaraki, Japan, pp. 606-620, presented at the Second Joint US/ Japan Conference on Adaptive Structures Nov. 12-14, 1991.
Yoshida, K et al., "COSMO-LAB Concept: A Cooperation of Space Robots and Structures" Department of Mechanical Engineering Science, Tokyo Institute of Technology, Tokyo, Japan, pp. 59-76, presented at the Second Joint US/Japan Conference on Adaptive Structures Nov. 12-14, 1991.

(56) References Cited

OTHER PUBLICATIONS

U.S. Pat. No. 31,777, "Iron Masts, Steeps, &c," issued to E.S. Boynton, patented on Mar. 26, 1861, 5 pages.

* cited by examiner

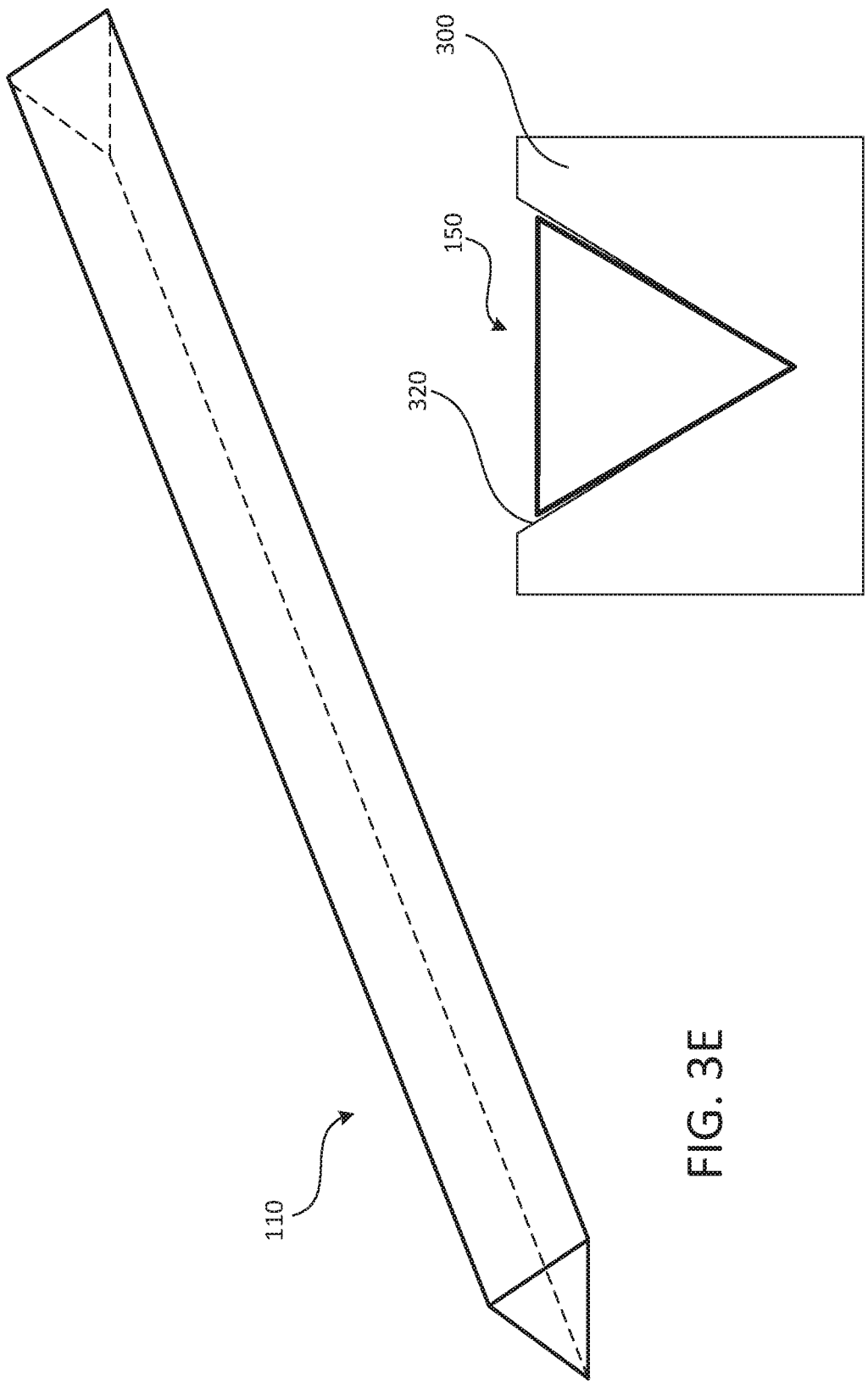

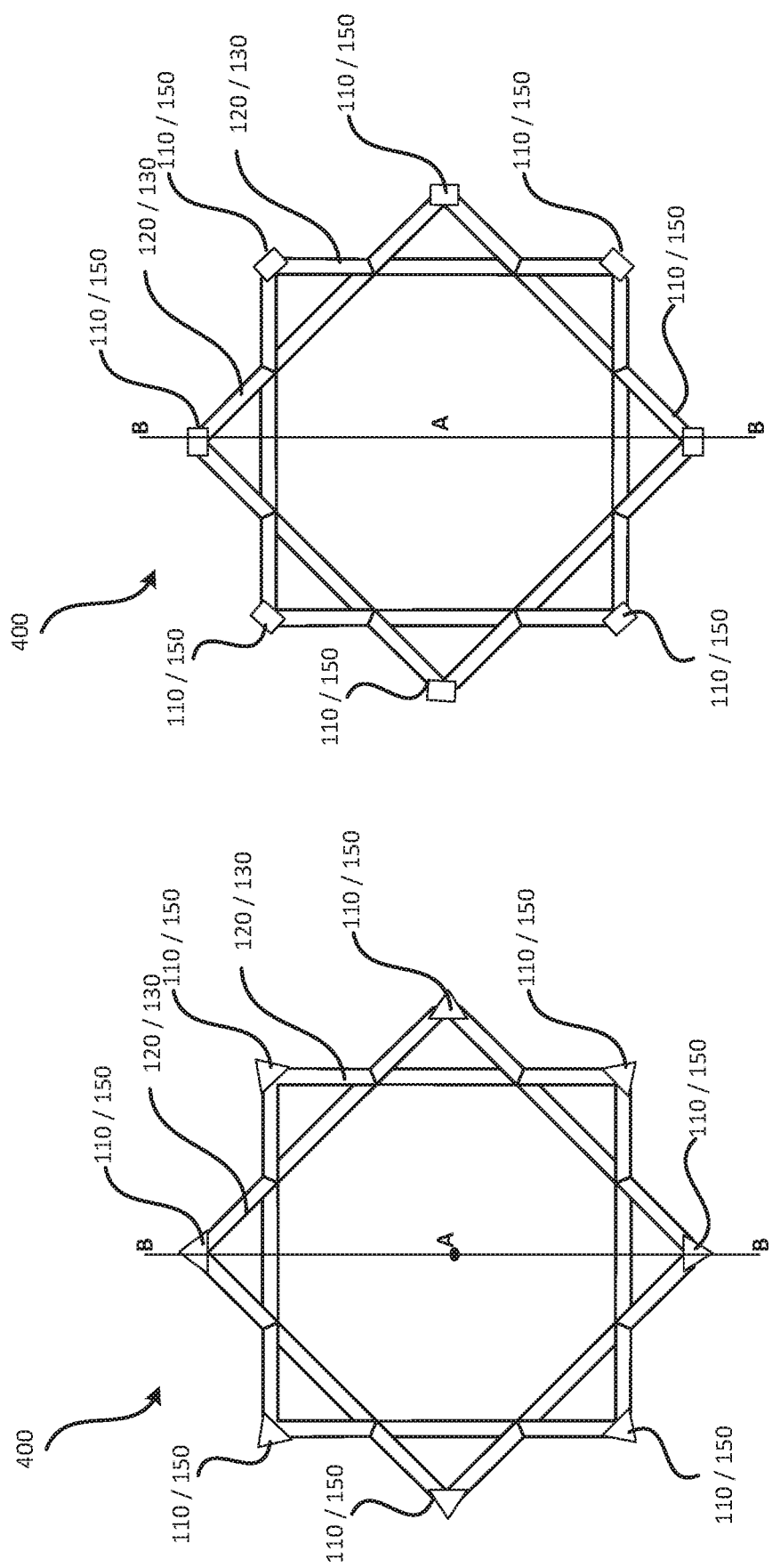

500

Start

Form first section
- interweave first portion of strands of first member with first portion of strands of second member
510

Form second section adjacent to first section
- position second portion of strands of second member adjacent to first section
520

Form third section adjacent to second section
- interweave second portion of strands of first member with third portion of strands of second member and position adjacent to second section
530

All strands of material from first & second members incorporated?
540

No / Yes

Process sections
550

End

FIG. 5

TRUSS STRUCTURE

CROSS REFERENCE TO RELATED APPLICATIONS

This application claims priority to U.S. Provisional Application No. 62/467,656, filed on Mar. 6, 2017, the disclosure of which is incorporated by reference herein in its entirety.

This application is related to U.S. patent application Ser. No. 15/913,832, filed on Mar. 6, 2018, the disclosure of which is incorporated by reference herein in its entirety.

FIELD

This document relates, generally, to truss structures.

BACKGROUND

A truss structure may include a plurality of load bearing members, or force members, that are joined at a plurality of nodes to define a load bearing structure. A truss structure may be employed in situations in which a support structure is to bear a considerable load across a relatively extensive span, and in a situation in which weight of the support structure itself may affect the performance of the support structure.

SUMMARY

In one aspect, a three-dimensional (3D) load bearing structure may include a transverse frame including a plurality of transverse members sequentially arranged so as to define a plurality of 3D polyhedral structures arranged in a helical pattern along a longitudinal direction of the load bearing structure, and a plurality of longitudinal members integrally coupled with the transverse frame. The plurality of longitudinal members may be arranged in parallel to a central longitudinal axis of the load bearing structure, and extend longitudinally along a length of the transverse frame. Each longitudinal member of the plurality of longitudinal members may be integrally coupled to a corresponding outer peripheral portion of each 3D polyhedral structure of the plurality of polyhedral structures defined by the plurality of transverse members of the transverse frame.

In another aspect, a method may include forming a node joining a longitudinal member of a truss structure with a transverse member of the truss structure, the transverse member defining a portion of a helical structure of the truss structure. Forming a node may include forming a first section of the node, including arranging fibers of a material of the longitudinal member and fibers of a material of the transverse member in a first pattern, and forming a second section of the node, the second section being adjacent to the first section, including arranging remaining fibers of the material of the longitudinal member and remaining fibers of the material of the transverse member in a second pattern. The second pattern may be different from the first pattern.

The details of one or more implementations are set forth in the accompanying drawings and the description below. Other features will be apparent from the description and drawings, and from the claims.

BRIEF DESCRIPTION OF THE DRAWINGS

FIG. 3E illustrates an example longitudinal member of an example truss structure, FIG. 3F is a cross sectional view of a portion of an example truss structure in an example manufacturing fixture.

FIGS. 4E-4F are axial end views of example truss structures, with longitudinal members being positioned at an outer peripheral portion of the example truss structures, in accordance with implementations described herein.

FIG. 5 is a flowchart of an example method of joining an example longitudinal member and an example transverse member, in accordance with implementations described herein.

DETAILED DESCRIPTION

A truss structure may include a plurality of load bearing members joined at a plurality of nodes, and arranged so that the assembled plurality of load bearing members act together, as a single load bearing structure. In some implementations, the load bearing members may be arranged, and joined at the plurality of nodes, so that the load bearing members and nodes are positioned in multiple different planes, defining a three dimensional truss structure. In some implementations, a plurality of longitudinal members may provide for bending and axial strength of the truss structure, and a plurality of transverse members may carry shear and torsional forces applied to the truss structure.

A truss structure, in accordance with implementations described herein, may include a plurality of longitudinal members extending along a longitudinal length of the truss structure. A plurality of transverse members may extend between the longitudinal members. The transverse members define one or more tetrahedral shapes. Portions of the transverse members defining these tetrahedral shapes may be respectively joined to the longitudinal members at a plurality of nodes, to form a lattice type truss structure. In some implementations, the plurality of longitudinal members and the plurality of transverse members may be formed by a series of interwoven fibers, for example, carbon fibers, impregnated with epoxy. The interweaving of these fibers, particularly at the nodes, may join the longitudinal members and the transverse members. This interweaving at the nodes may provide for structural integration of the longitudinal members and the transverse members.

Figure 1A:
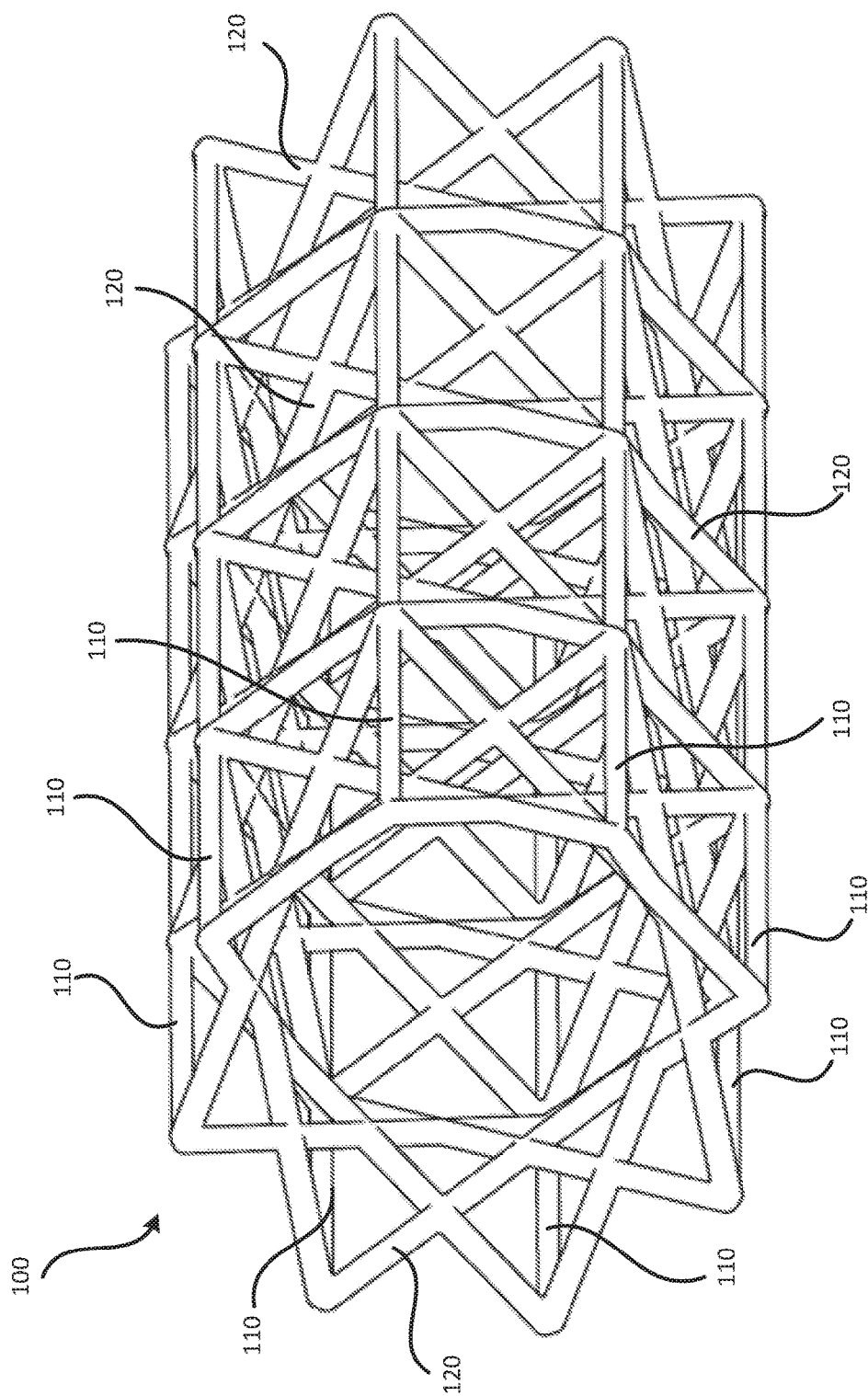
FIG. 1A is a perspective view.
Figure 1B:
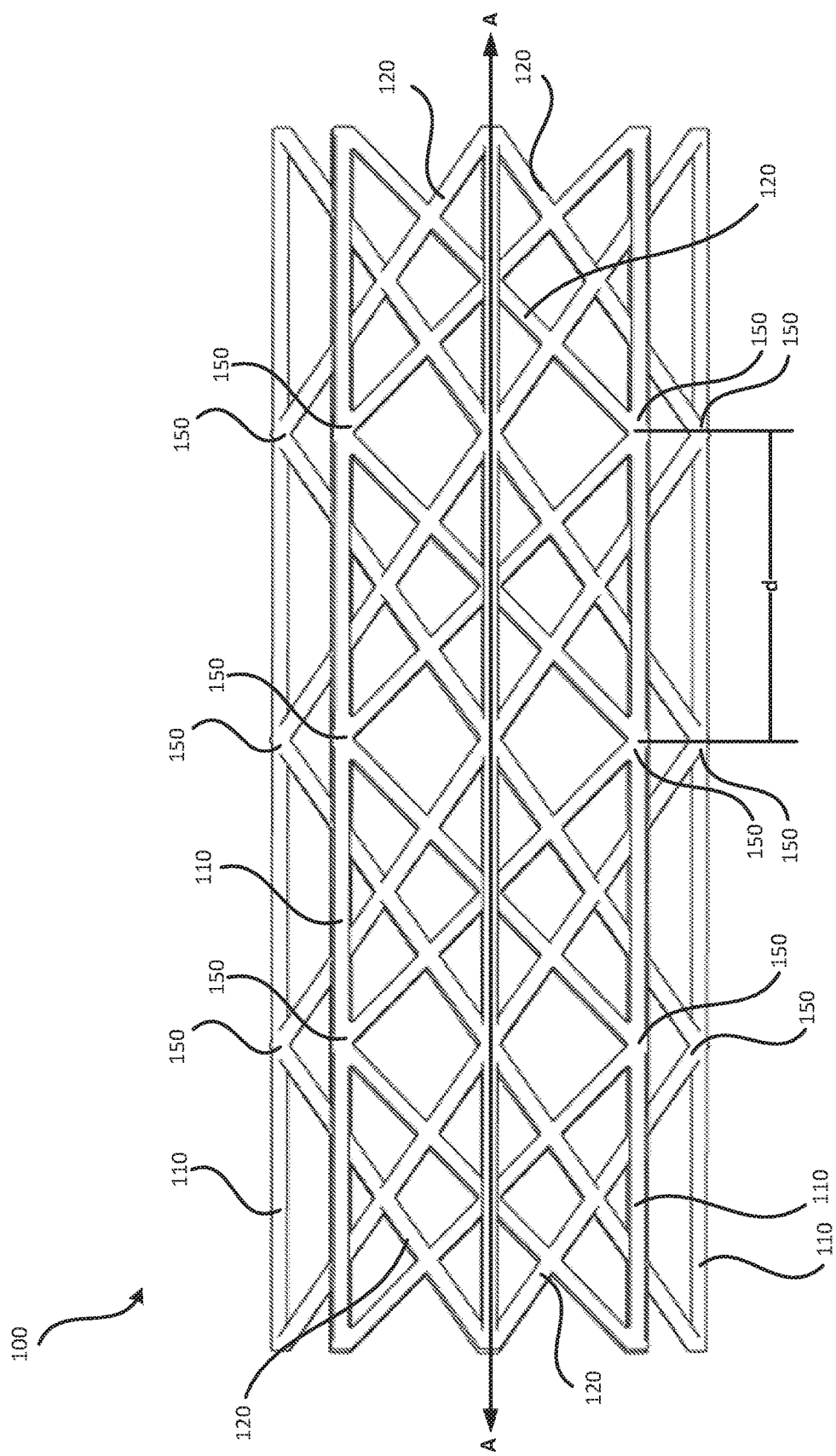
FIG. 1B is a side view.
Figure 1C:
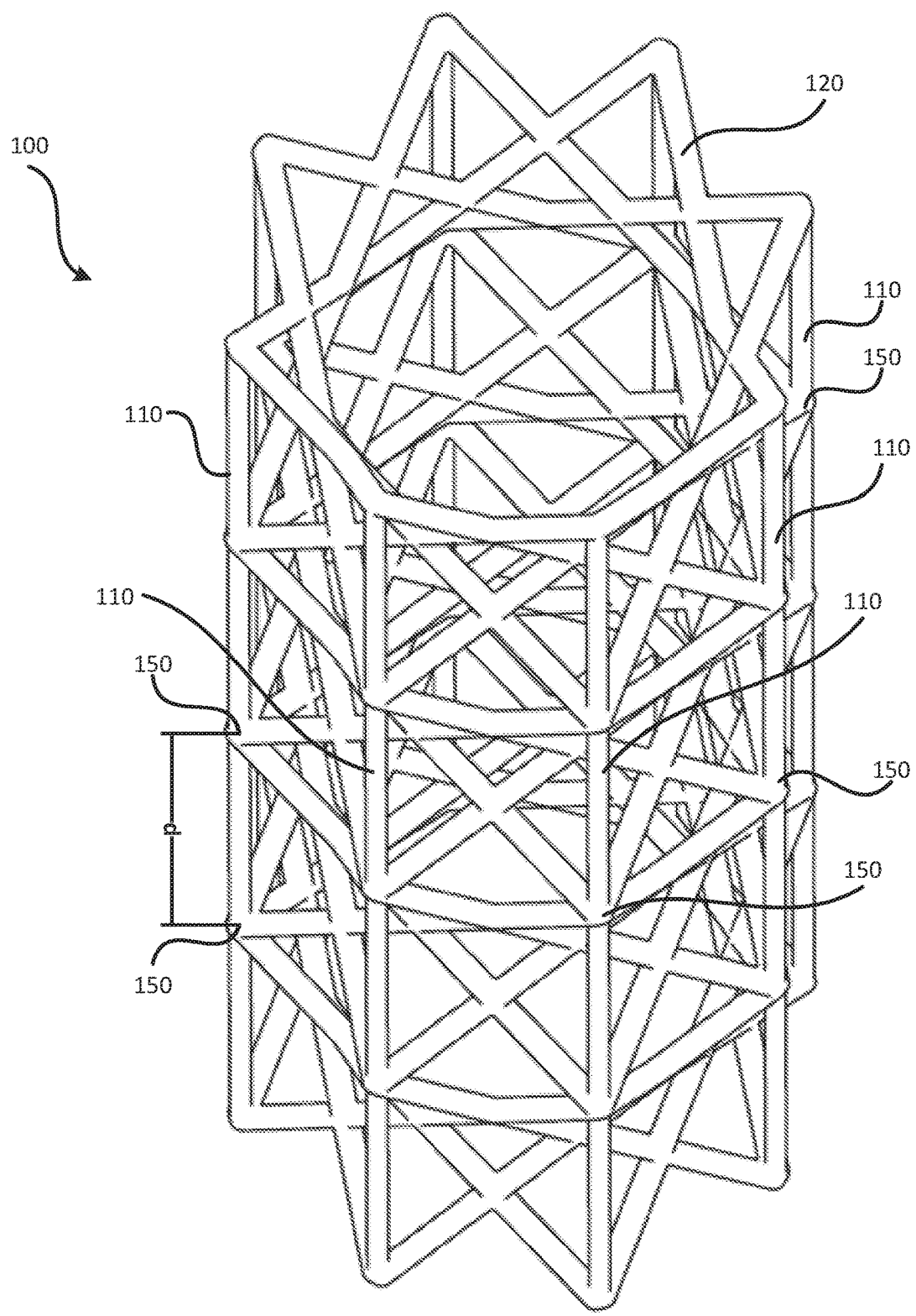
FIG. 1C is an isometric view.
Figure 1D:
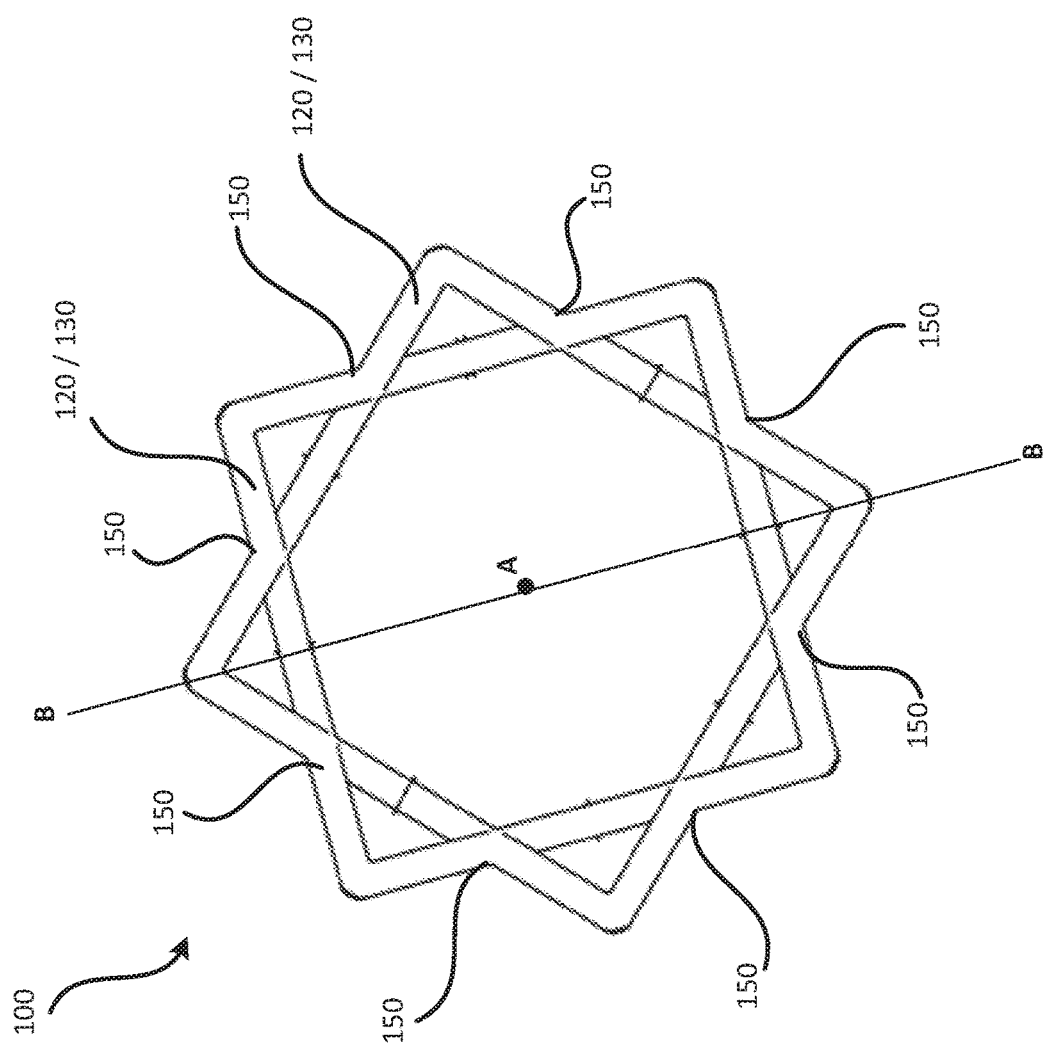
FIG. 1D is an axial end view, of an example truss structure, in accordance with implementations described herein.

An example truss structure 100, in accordance with implementations described herein, is shown in FIGS. 1A-1D. In particular, FIG. 1A is a perspective view of the example truss structure 100, FIG. 1B is a side view of the example truss structure 100, FIG. 1C is an isometric view of the example truss structure 100, and FIG. 1D is an axial end view of the example truss structure 100. The example truss structure 100 shown in FIGS. 1A-1D is illustrated in a substantially horizontal orientation, with a central longitudinal axis A of the example truss structure 100 extending substantially horizontally, simply for purposes of discussion and illustration. However, the principles to be described herein with respect to the truss structure 100 may also be applied to a plurality of other orientations of the truss structure 100.

The example truss structure 100 may include a plurality of longitudinal members 110 extending axially, along a length L of the truss structure 100. The plurality of longitudinal members 110 may define a longitudinal frame portion of the truss structure 100. This longitudinal frame defined by the plurality of longitudinal members 110 may carry an axial load portion of a force exerted on, or a load borne by the truss structure 100. The example truss structure 100 shown in FIGS. 1A-1D includes eight longitudinal members 110. However, in some implementations, the truss structure 100 may include more, or fewer, longitudinal members 110. Numerous factors may affect the number of longitudinal members 110 included in the truss structure 100. These factors may include, for example, a length of the truss structure 100, a load to be carried by the truss structure 100 (including, for example, an amount of torsional loading, an amount of bending loading, an amount of tension/compression loading, and other such loads which may be applied to the truss structure 100), and the like.

The plurality of longitudinal members 110 defining the longitudinal frame portion of the truss structure 100 may be arranged in parallel to each other, and in parallel with the central longitudinal axis A of the truss structure 100. The arrangement of the longitudinal members 110 may be symmetric about any one of a plurality of different central planes extending through the central longitudinal axis A of the truss structure 100. The exemplary central plane B extending through the central longitudinal axis A of the truss structure 100 shown in FIG. 1D is just one example of a central plane extending through the central longitudinal axis A of the truss structure 100. The longitudinal members 110 of the truss structure 100 may be symmetrically arranged about any number of different central planes extending through the central longitudinal axis of the truss structure 100.

The longitudinal members 110 of the truss structure 100 may carry an axial, or compressive, or bending load applied to the truss structure 100. The transverses members 120 may provide reinforcement to the longitudinal members, to provide buckling resistance to the longitudinal members 110. In some situations/arrangements, the transverse members 120 carry a torsional component of the load applied to the truss structure 100.

The example truss structure 100 may include a plurality of transverse members 120. The plurality of transverse members 120 may define a transverse frame portion of the truss structure 100. This transverse frame portion of the truss structure 100 defined by the plurality of transverse members 120 may carry a torsional load portion of a force exerted on, or a load borne by the truss structure 100. The transverse frame may be coupled to, or joined with, or intersect, or be integrally formed with, the longitudinal frame to form the truss structure 100. That is, the transverse members 120 may be coupled to, or joined with, or intersect, or be integrally formed with, the longitudinal members 110 at a respective plurality of nodes 150.

In some implementations, the transverse members 120 may be disposed in a helical arrangement with respect to the longitudinal members 110 defining the longitudinal frame.

For ease of discussion and illustration, FIGS. 2A-2H illustrate a sequential addition of exemplary three dimensional polyhedral structures 130 (each formed by a series of transverse members 120 arranged end to end) to an exemplary longitudinal frame including a plurality of longitudinal members 110, to form the truss structure 100, in accordance with implementations described herein. These three dimensional polyhedral structures 130 may be referred to as helical structures 130, simply for ease of discussion, in that the three dimensional polyhedral structures 130 appear to follow a somewhat helical pattern with respect to the longitudinal frame defined by the longitudinal members 110. The helical structures 130 may be incrementally, and sequentially, positioned along the longitudinal frame defined by the longitudinal members 110. In the example shown in FIGS. 2A-2H, the longitudinal frame includes eight longitudinal members 110 arranged in parallel to each other, about a central longitudinal axis A, and arranged symmetrically about a central longitudinal plane B, as described above. Each of FIGS. 2A through 2H includes an axial view (a) of the truss structure 100, and a longitudinal perspective view (b) of the truss structure 100 as a series of helical structures 130 are added to the arrangement of longitudinal members 110. However, as noted above, the truss structure 100 may include more, or fewer, longitudinal members 110, with a configuration of the helical structures 130 formed by the arrangement of transverse members 120 being defined according to the number of longitudinal members 110.

As noted above, FIGS. 2A-2H provide a sequential illustration of the arrangement of exemplary helical structures 130 relative to the exemplary arrangement of longitudinal members 110. This exemplary sequential illustration in FIGS. 2A-2H is provided to facilitate an understanding of the physical arrangement of the transverse members 120 (making up the helical structures 130) relative to the longitudinal members 110. The exemplary sequential illustration shown in FIGS. 2A-2H is not intended to be representative of the process by which the truss structure 100, in accordance with implementations described herein, is actually manufactured.

Figure 2A:
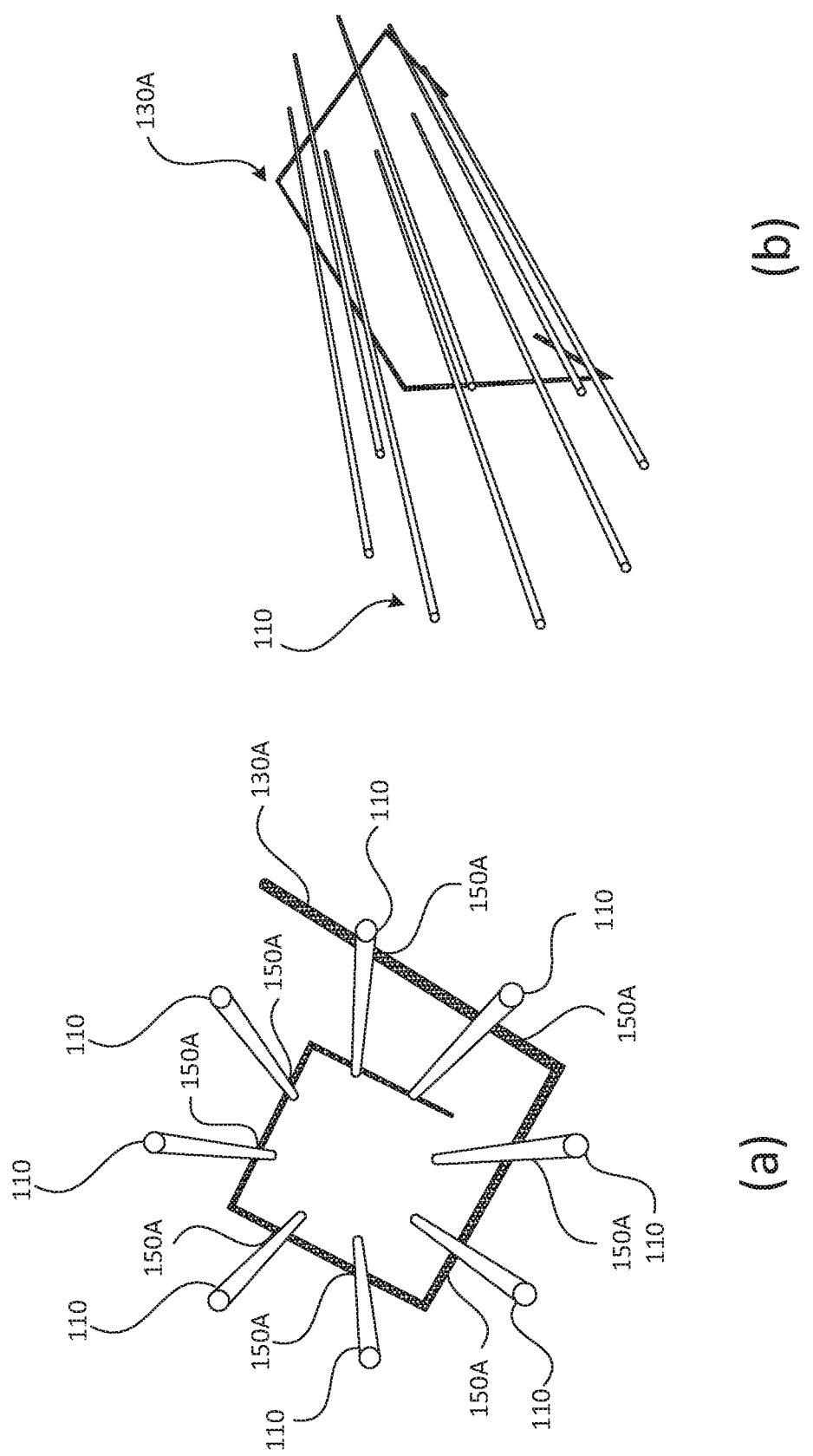
FIGS. 2A-2H illustrate an exemplary sequential application of three dimensional polyhedral structures to a longitudinal frame formed by a plurality of longitudinal members to form an example truss structure, in accordance with implementations described herein.
Figure 2B:
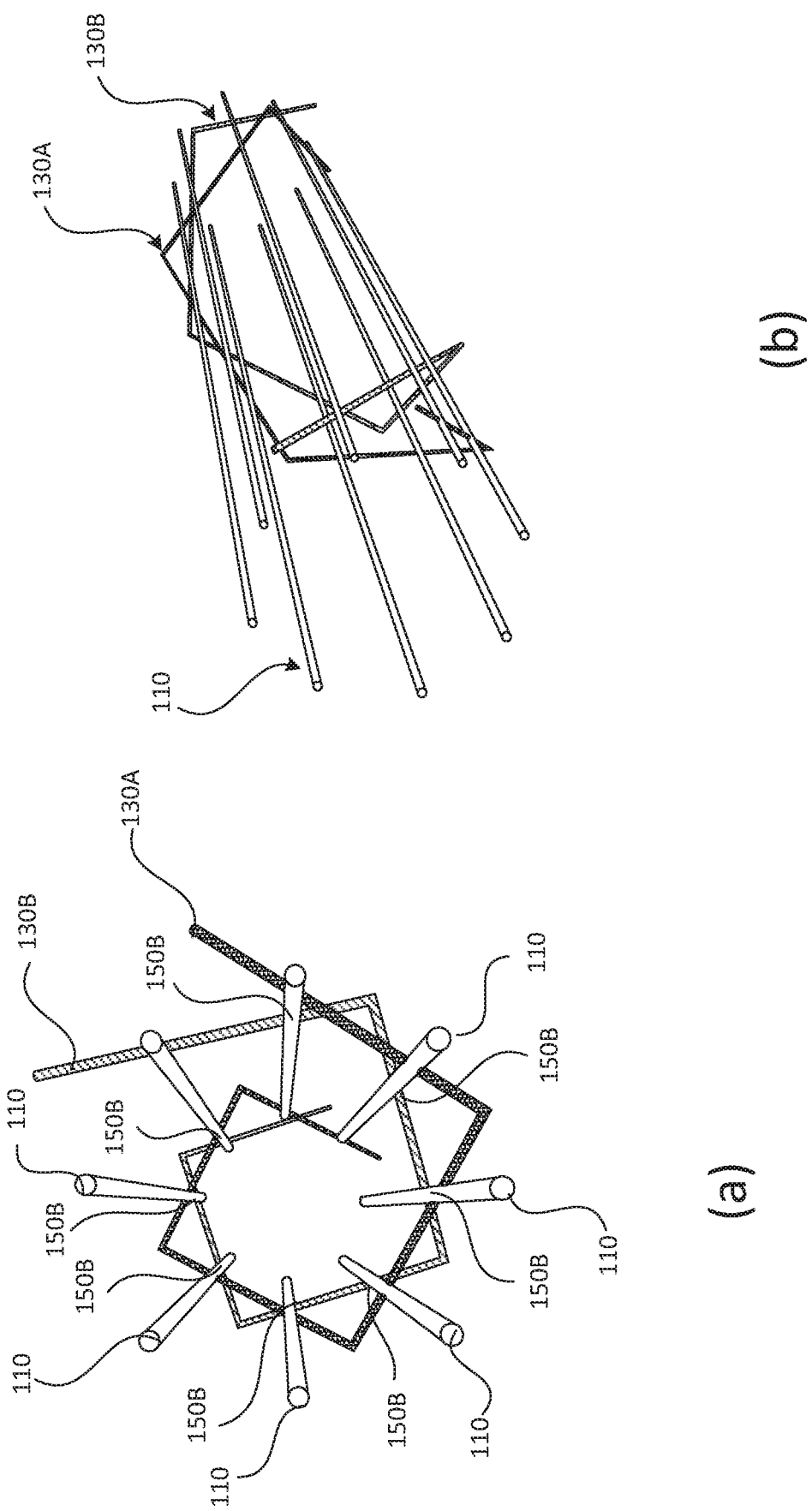
Figure 2C:
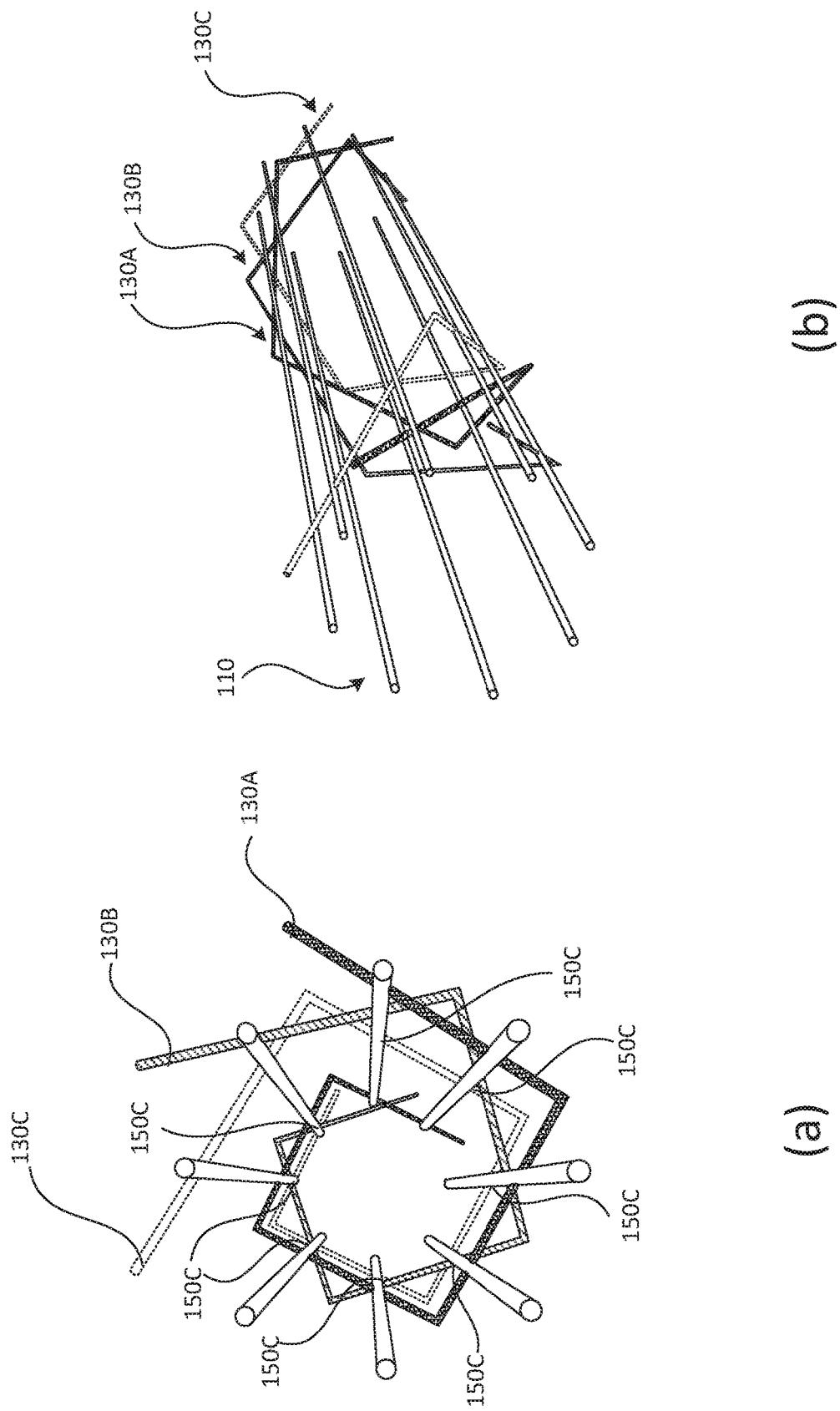
Figure 2D:
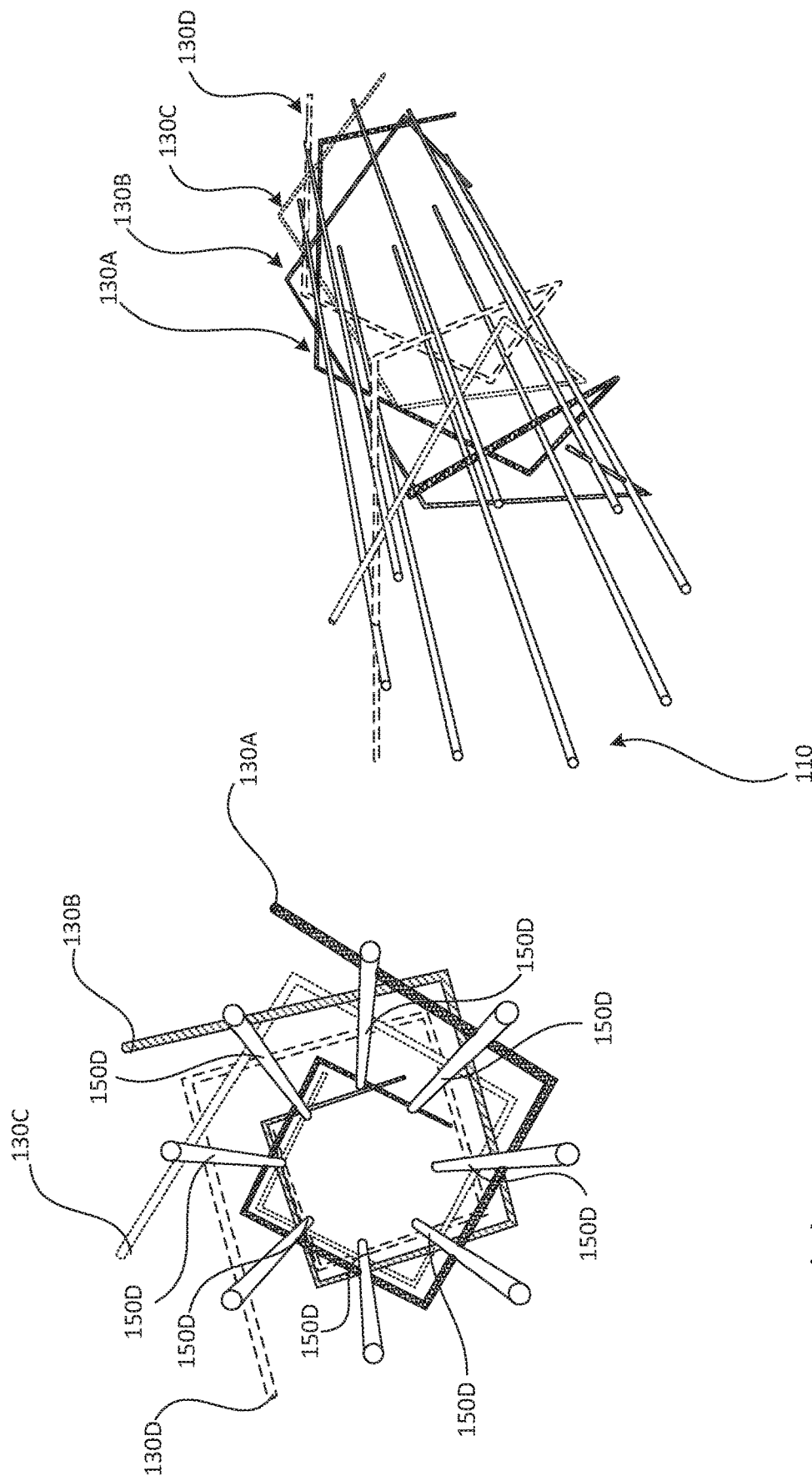
Figure 2E:
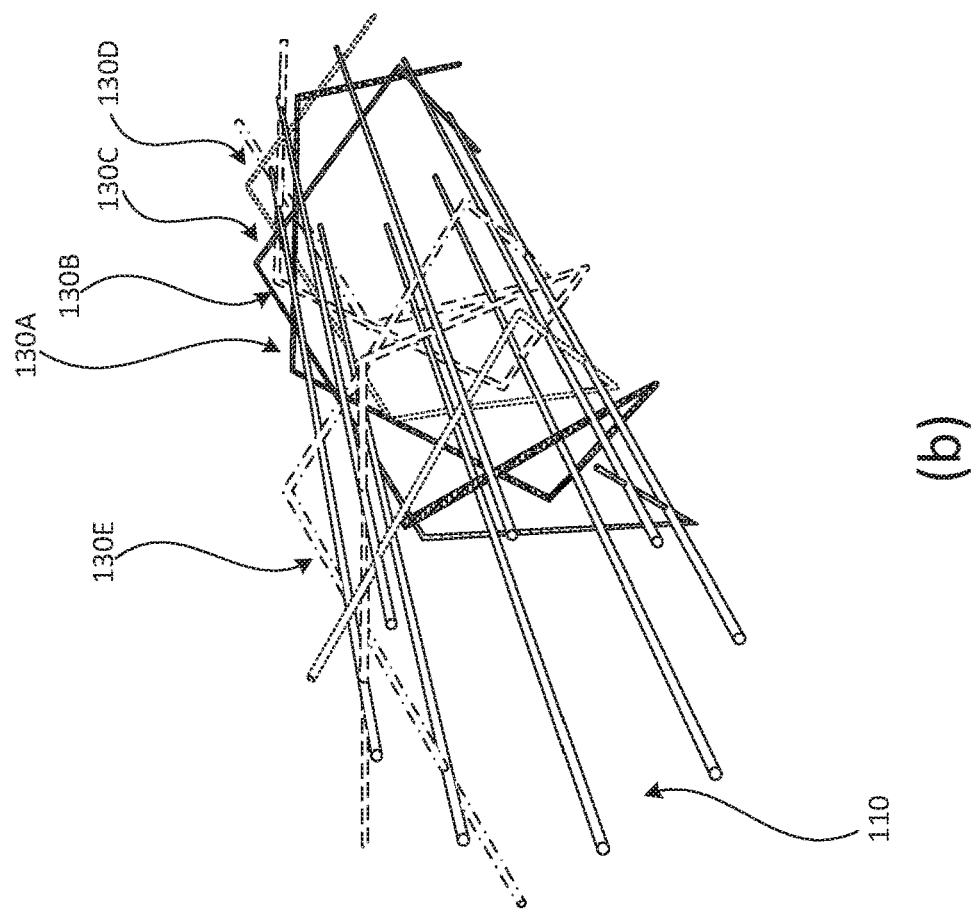
Figure 2E:
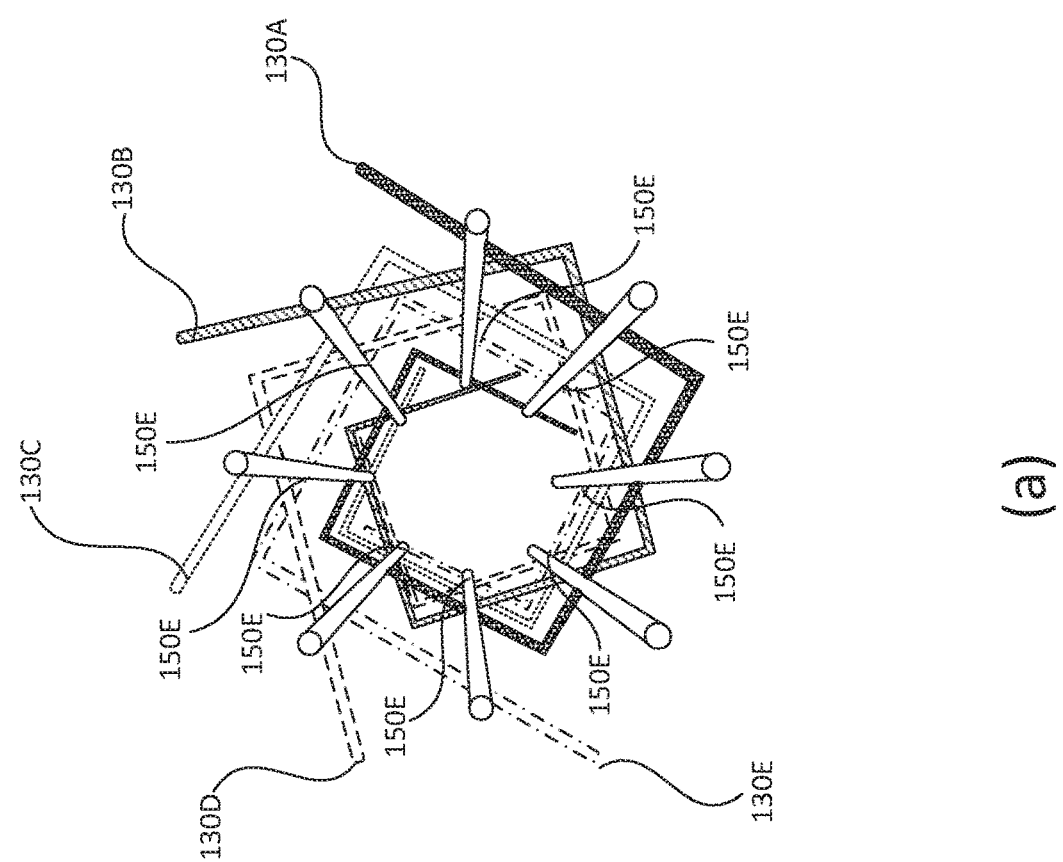
Figure 2F:
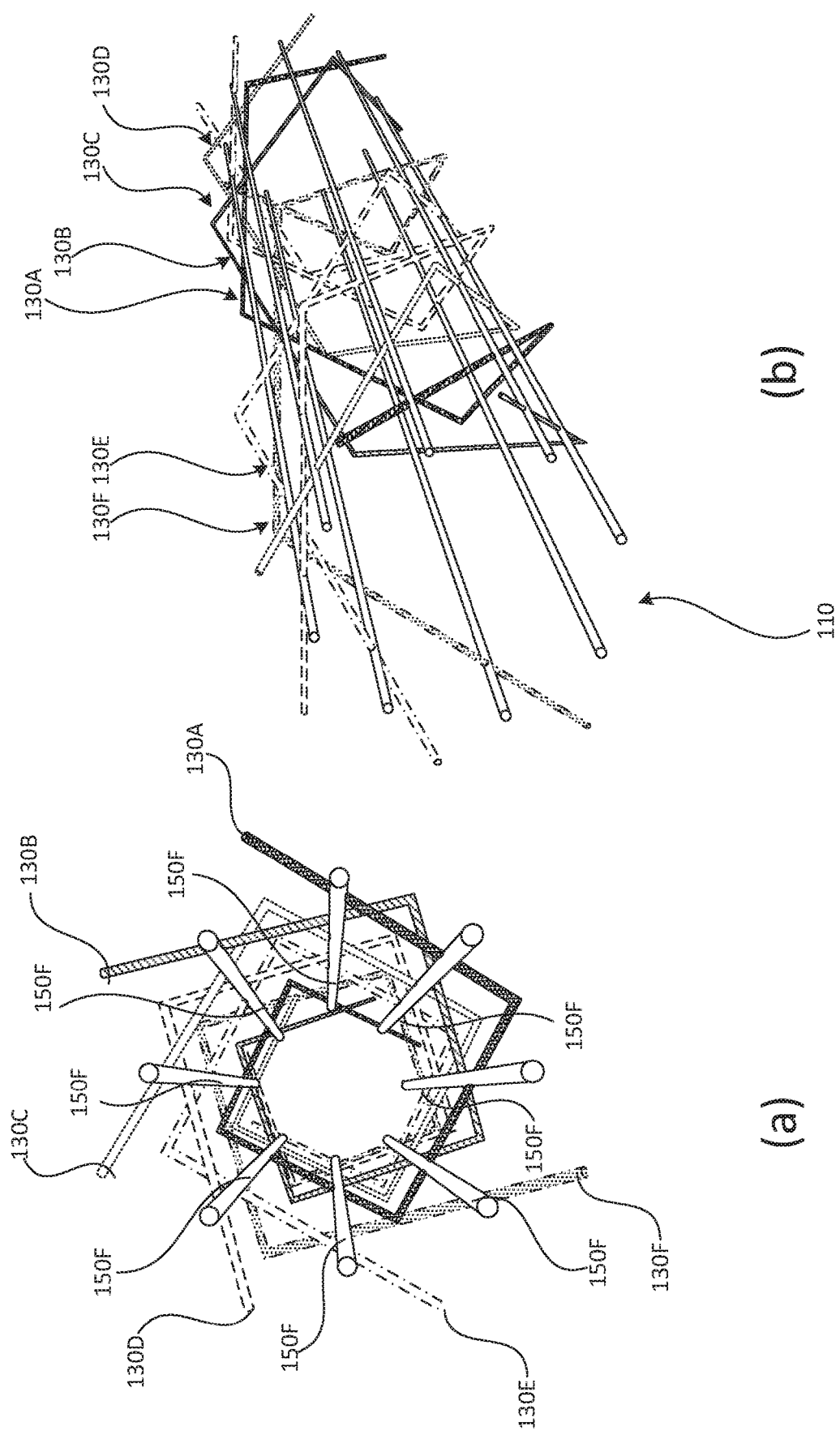
Figure 2G:
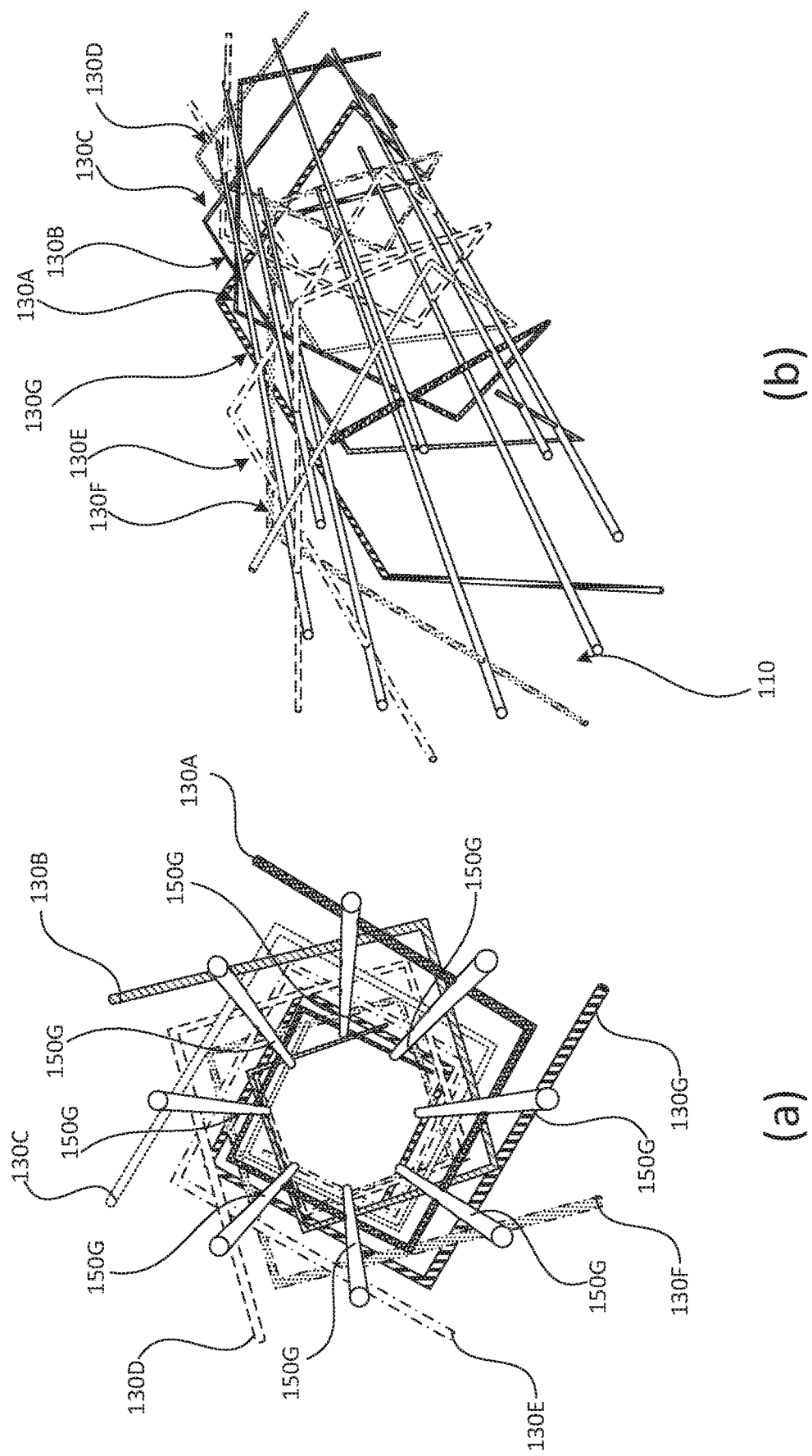

As shown in FIGS. 2A(a) and 2A(b), a first helical structure 130A may include a plurality of transverse members 120 arranged end to end to define the first helical structure 130A. Each of the transverse members 120 of the first helical structure 130A may be joined with respective longitudinal members 110 of the longitudinal frame at respective nodes 150A. FIGS. 2B(a) and 2B(b) illustrate a second helical structure 130B joined with the longitudinal members 120 of the longitudinal frame at respective nodes 150B. As shown in FIGS. 2B(a) and 2B(b), the second helical structure 130B may include a plurality of transverse members 120 arranged end to end to define the second helical structure 130B. Similarly, FIGS. 2C(a) and 2C(b) illustrate a third helical structure 130C, including a plurality of transverse members 120 arranged end to end, joined with the longitudinal members 120 of the longitudinal frame at respective nodes 150C; FIGS. 2D(a) and 2D(b) illustrate a fourth helical structure 130D, including a plurality of transverse members 120 arranged end to end, joined with the longitudinal members 120 of the longitudinal frame at respective nodes 150D; FIGS. 2E(a) and 2E(b) illustrate a fifth helical structure 130E, including a plurality of transverse members 120 arranged end to end, joined with the longitudinal members 120 of the longitudinal frame at respective nodes 150E; FIGS. 2F(a) and 2F(b) illustrate a sixth helical structure 130F, including a plurality of transverse members 120 arranged end to end, joined with the longitudinal members 120 of the longitudinal frame at respective nodes 150F; FIGS. 2G(a) and 2G(b) illustrates a seventh helical structure 130G, including a plurality of transverse members 120 arranged end to end, joined with the longitudinal members 120 of the longitudinal frame at respective nodes 150G; and FIGS. 2H(a) and 2H(b) illustrate an eighth helical structure 130H, including a plurality of transverse members 120 arranged end to end, joined with the longitudinal members 120 of the longitudinal frame at respective nodes 150H.

Figure 2H:
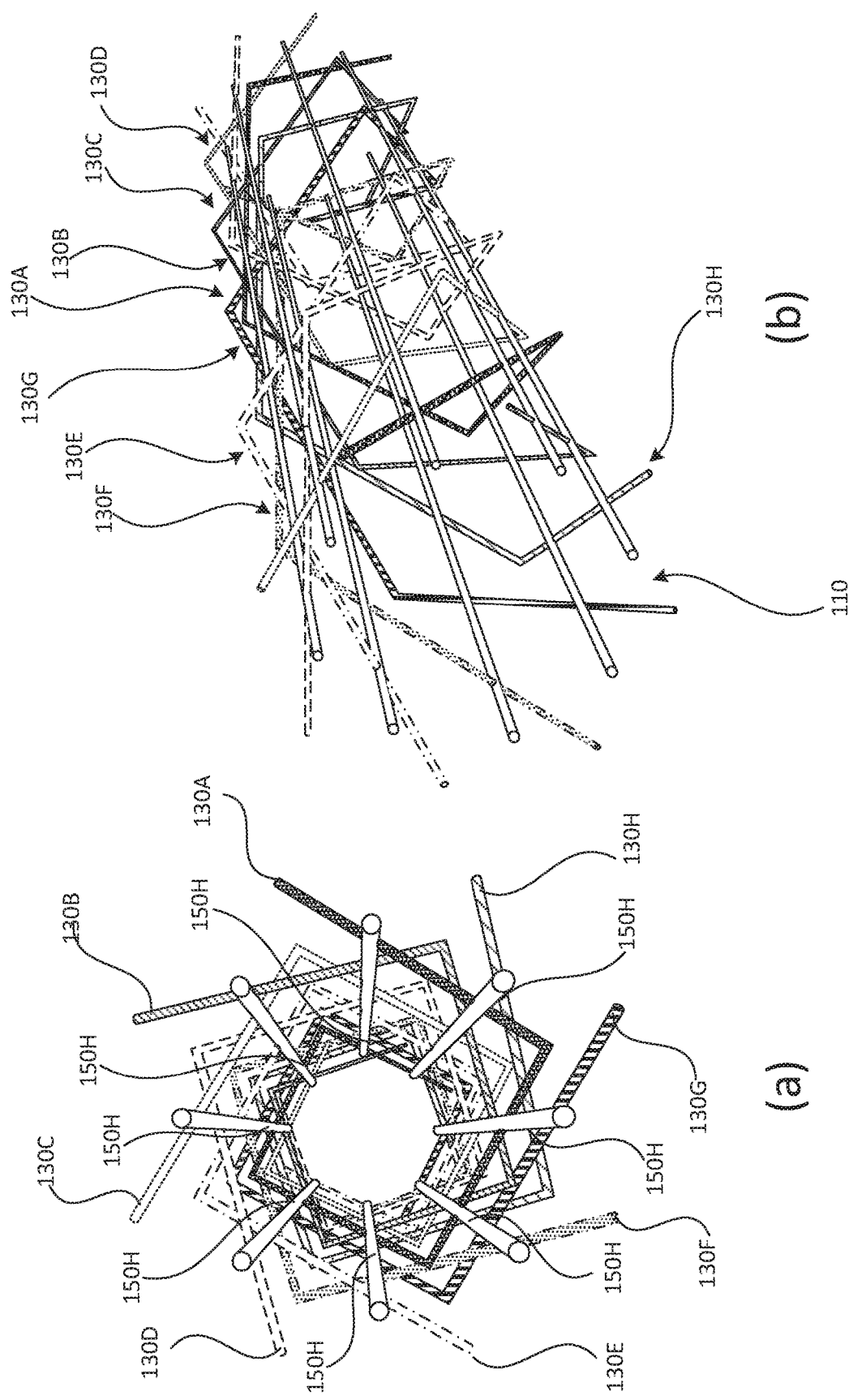

In the example arrangement shown in FIG. 2H, the transverse members 120 are arranged in eight helical structures 130A through 130H, each defining a somewhat square helical section, joined with eight longitudinal members 110 of the longitudinal frame to form the truss structure 100. However, the truss structure 100 may include more, or fewer, longitudinal members 110 and/or more, or fewer, helical structures 130 formed by the transverse members 120. For example, in some implementations, the truss structure 100 may include six longitudinal members 110. In a truss structure 100 including six longitudinal members 110, the helical structures 130 (each including transverse members 120 arranged end to end) may define somewhat triangular helical sections joined with the longitudinal members 110 at the respective nodes 150. In the example arrangement shown in FIG. 2H, the helical structures 130 are in a counter-clockwise arrangement with respect to the longitudinal members 110. However, in some implementations, the helical structures 130 may be in a clockwise arrangement with respect to the longitudinal members 110.

As noted above, the number of longitudinal members 110 and corresponding number of helical structures 130 (each defined by transverse members 120 arranged end to end) of a particular truss structure may vary based on, for example, an amount of load to be borne by the truss structure, a type of load, a distribution of load, a particular application and/or installation and/or environment in which the truss structure is to be used, and other such factors. In some situations, a truss structure including eight longitudinal members 110 may provide increased rigidity when compared to a truss structure including six longitudinal members 110. A mass of the truss structure including eight longitudinal members 110 may be positioned further (radially outward) from the central longitudinal axis A of the truss structure, when compared to the truss structure including six longitudinal members 110, resulting in a comparatively greater moment of inertia for the truss structure including eight longitudinal members 110. In some arrangements, in the truss structure including eight longitudinal members 110, the helical structures 130 maybe positioned further from the central longitudinal axis A than in the truss structure including six longitudinal members 110, providing for a comparatively greater torque carrying capability for the truss structure including eight longitudinal members 110.

In some implementations, a truss structure including eight longitudinal members 110 positioned at the outer peripheral portion of the truss structure may exhibit as much as 70% greater stiffness, or rigidity, than a comparably sized truss structure including six longitudinal members 110. In some implementations, a truss structure including eight longitudinal members 110 may exhibit as much as 40% to 50% greater torque capacity than a comparably sized truss structure including six longitudinal members 110.

In some implementations, the longitudinal members 110 and the transverse members 120 are joined at a straight portion of the transverse member 120. For example, in some implementations, the nodes 150 (at which the longitudinal members 110 and the transverse members 120 are joined) may occur at a straight portion of the helical structure 130 (i.e., a straight portion of the corresponding transverse member120), where the helical structure 130 does not change direction, rather than at a portion of the helical structure 130 at which one transverse member 120 is joined to the next adjacent transverse member 120 and the contour of the helical structure 130 changes direction. Connection of the transverse members 120 and the longitudinal members 110 at respective straight portions of the transverse members 120 may enhance the reinforcement of the buckling strength, or buckling resistance, of the longitudinal members 110, and thus enhance the overall strength, and buckling resistance, of the overall truss structure 100. Buckling strength of the truss structure 100 may also be affected by a distance between nodes 150 along a longitudinal member 110. That is, buckling strength, or buckling resistance, of the longitudinal member 110, and of the overall truss structure 100, may be further enhanced, or increased, as a distance d (see FIG. 1B) between adjacent nodes 150 along the longitudinal member 110 is decreased.

In some implementations, a material from which the longitudinal members 110 and/or the transverse members are made may be selected, taking into account various different characteristics of the material (such as, for example, strength, weight, cost, availability and the like), together with required characteristics of the truss structure 100 (such as, for example, size, load bearing capability and the like). For example, in some implementations, the longitudinal members 110 and/or the transverse members 120 may be made of a carbon type material, a glass type material, a basalt type material, a kevlar type material, and other such materials.

The truss structure 100 including longitudinal members 110 and/or transverse members 120 made of, for example, a carbon fiber material may be relatively light in weight relative to, for example, a comparable support structure made of, for example, a metal material such as steel, while being capable of bearing the same (or a greater) load than the comparable support structure made of a metal material. In another comparison, the truss structure 100 including longitudinal members 110 and/or transverse members 120 made of this type of carbon fiber material may be considerably stronger than, for example, a comparable support structure made of, for example, a metal material, of essentially the same weight and/or size. For example, in some implementations, the truss structure 100 including longitudinal members 110 and/or transverse members 120, structured in the manner described herein, and made of this type of carbon fiber material, may be approximately ten times stronger, than a steel tube of essentially the same weight.

A truss structure 100, in accordance with implementations described herein, may garner a considerable increase in strength from the material used for the longitudinal members 110 and/or the transverse member 120, in combination with the geometric structure defined by the arrangement of the longitudinal members 110 and the transverse members 120, and/or the geometric structure of the longitudinal members 110 and/or the transverse members 120 themselves.

In some implementations, a cross sectional shape of one or more of the longitudinal members 110 may be substantially triangular. In some implementations, a cross section of one or more of the longitudinal members 110 may be defined by another shape. For example, in some implementations, the cross sectional shape of one or more of the longitudinal members 100 may be circular, elliptical, square, rectangular, trapezoidal, and the like. In some implementations, all of the longitudinal members 100 may have substantially the same cross sectional shape. In some implementations, a cross sectional shape of one or more of the transverse members 120 may be substantially triangular. In some implementations, a cross section of one or more of the transverse members 120 may be defined by another shape. For example, in some implementations, the cross sectional shape of the one or more of the transverse members 120 may be circular, elliptical, square, rectangular, trapezoidal, and the like. In some implementations, all of the transverse members 120 may have substantially the same cross sectional shape. In some implementations, the cross sectional shape of one or more of the longitudinal members 110 may be substantially the same as the cross sectional shape as one or more of the transverse members 120. In some implementations, the longitudinal members 110 and the transverse members 120 may have different cross sectional shapes.

Hereinafter, an exemplary truss structure 200 will be described in which the longitudinal members 110 have a triangular cross sectional shape. In some implementations, the transverse members 120 of this exemplary truss structure 200 may also have a triangular cross sectional shape.

Figure 3A:
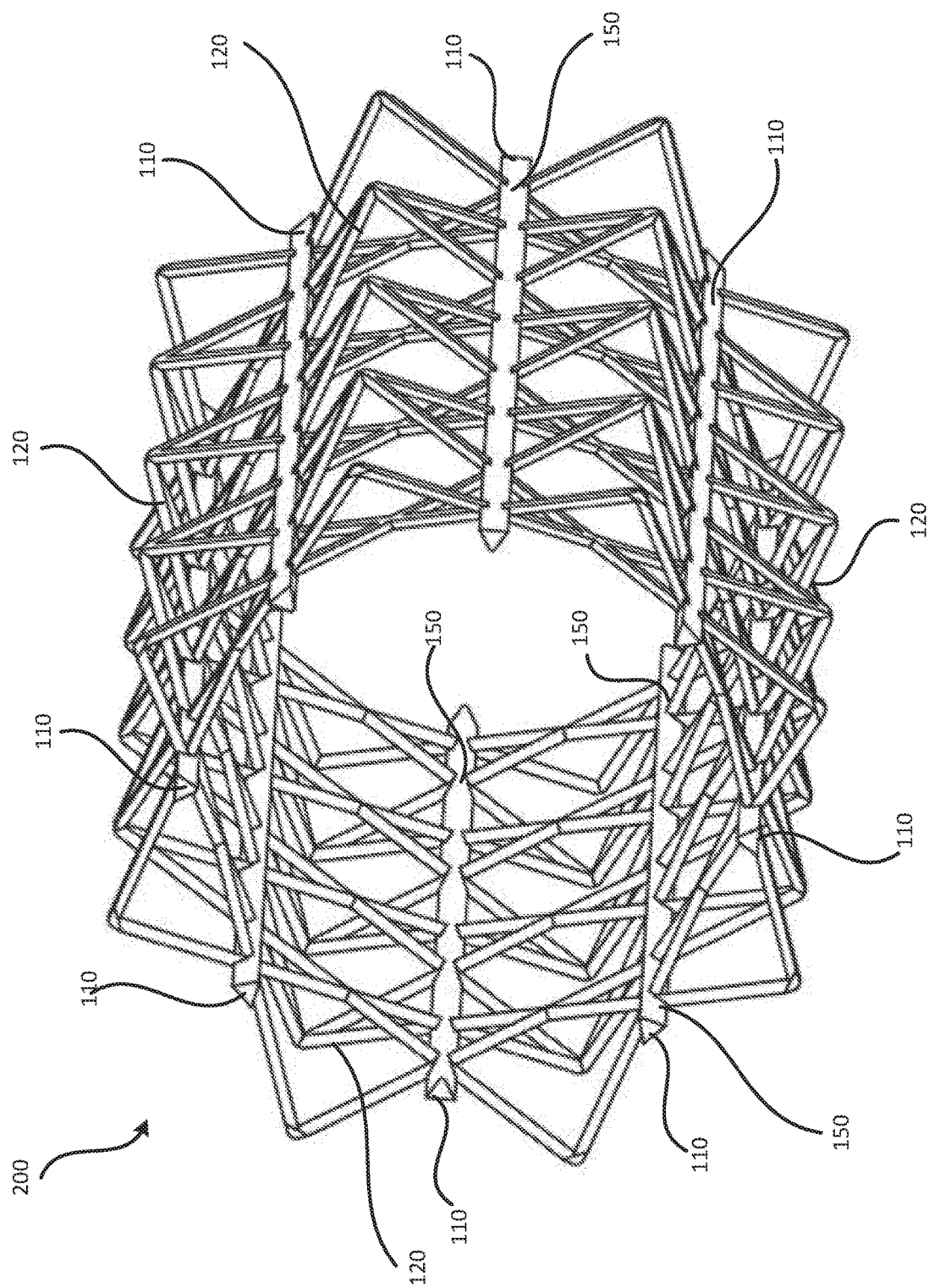
FIG. 3A is a perspective view.
Figure 3B:
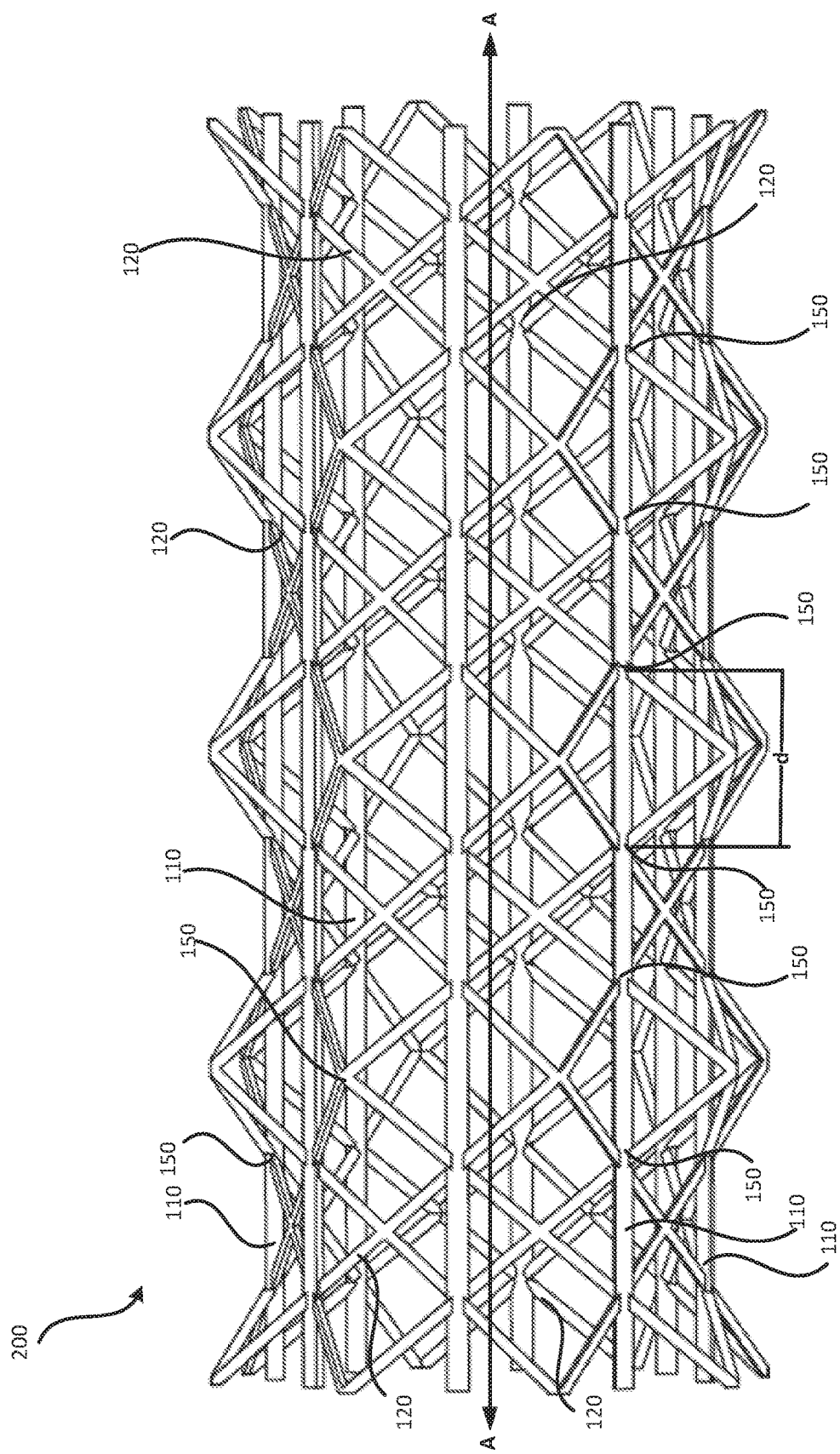
FIG. 3B is a side view.
Figure 3C:
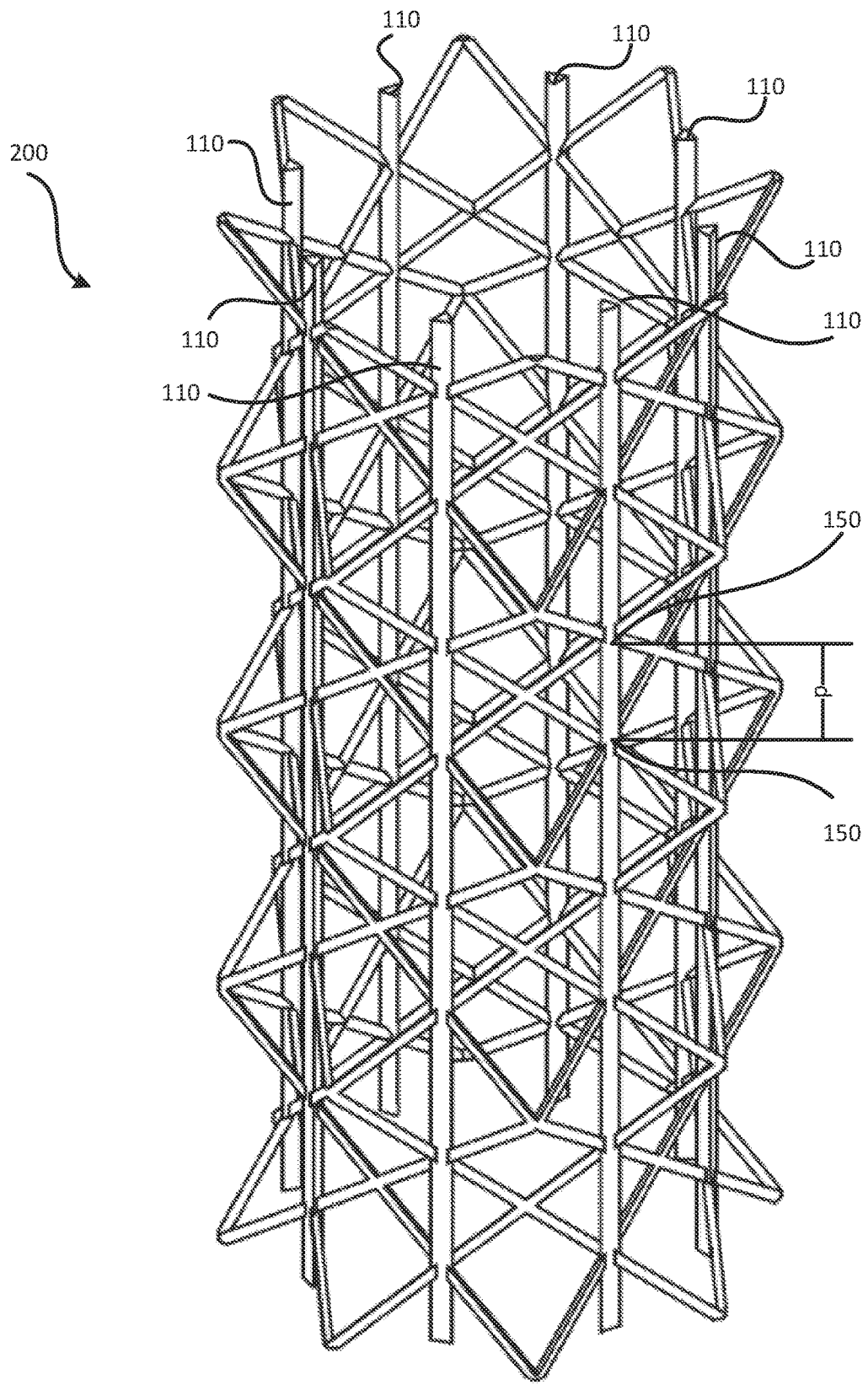
FIG. 3C is an isometric view.
Figure 3D:
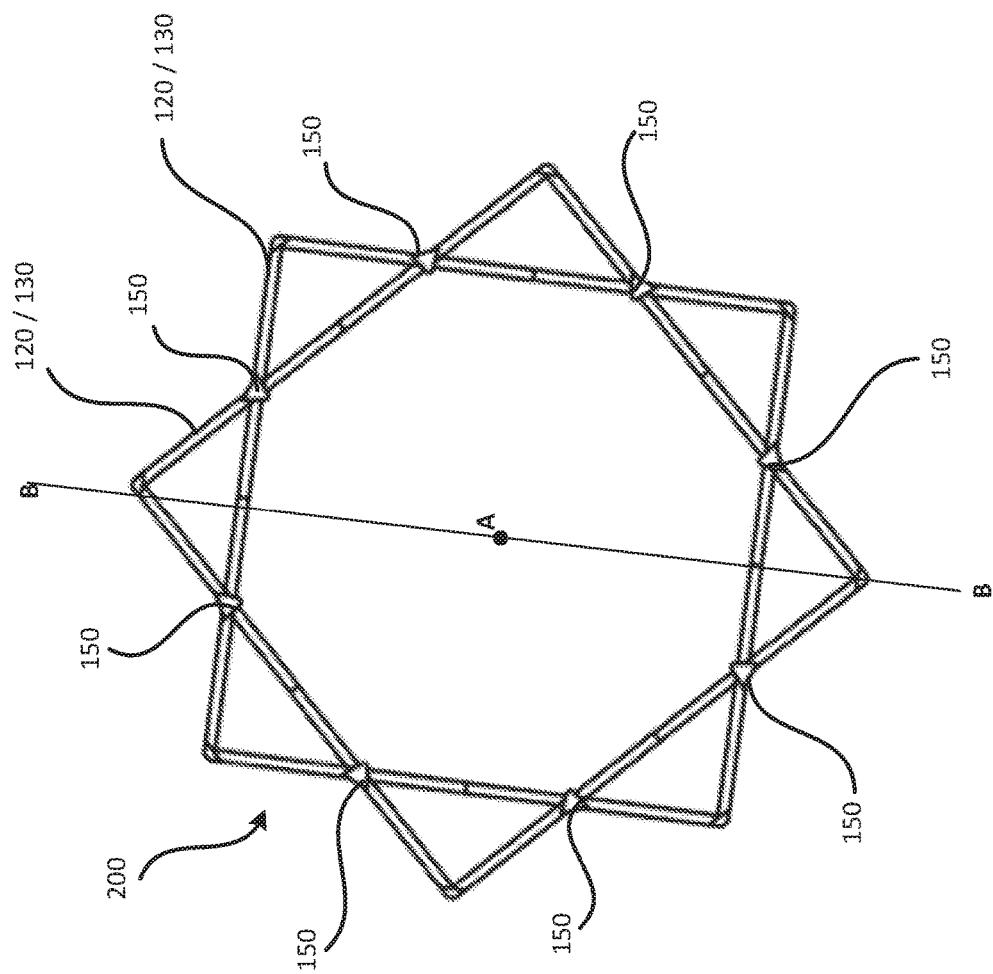
FIG. 3D is an axial end view, of an example truss structure, in accordance with implementations described herein.
Figure 3G:
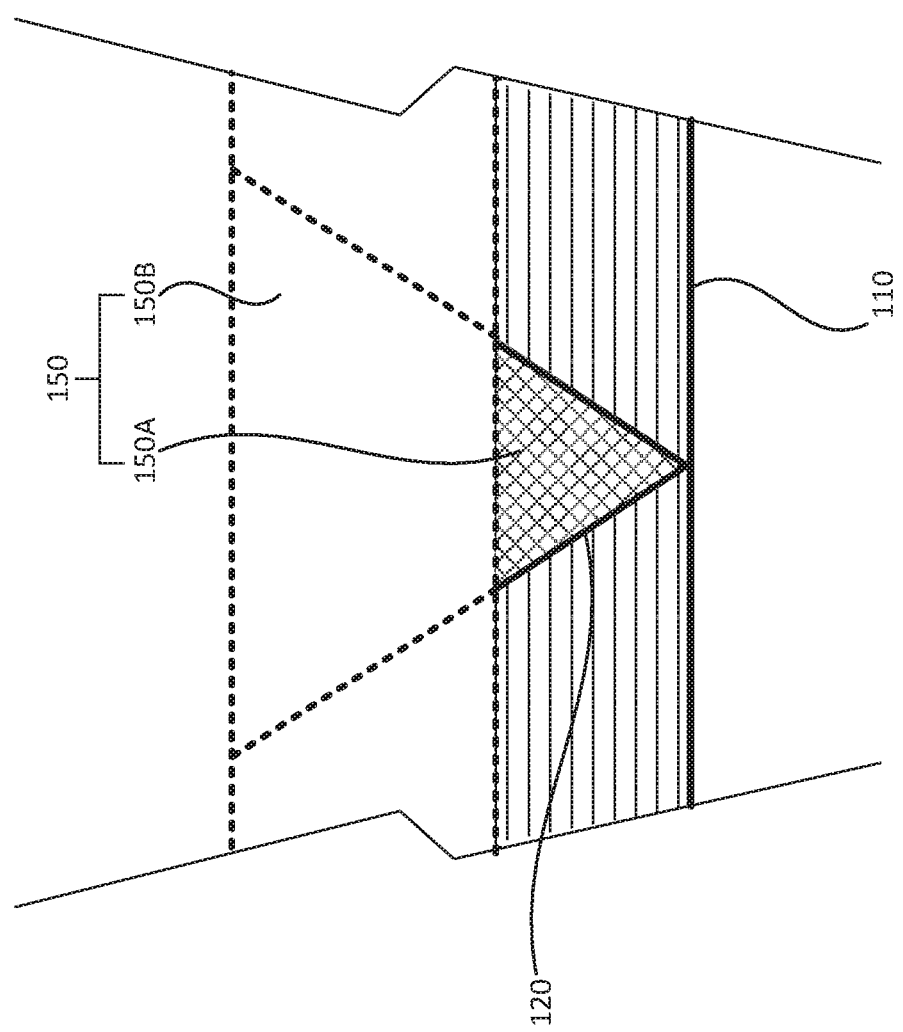
FIG. 3G is a cross sectional view of a node of an example truss structure, in accordance with implementations described herein.
Figure 4A:
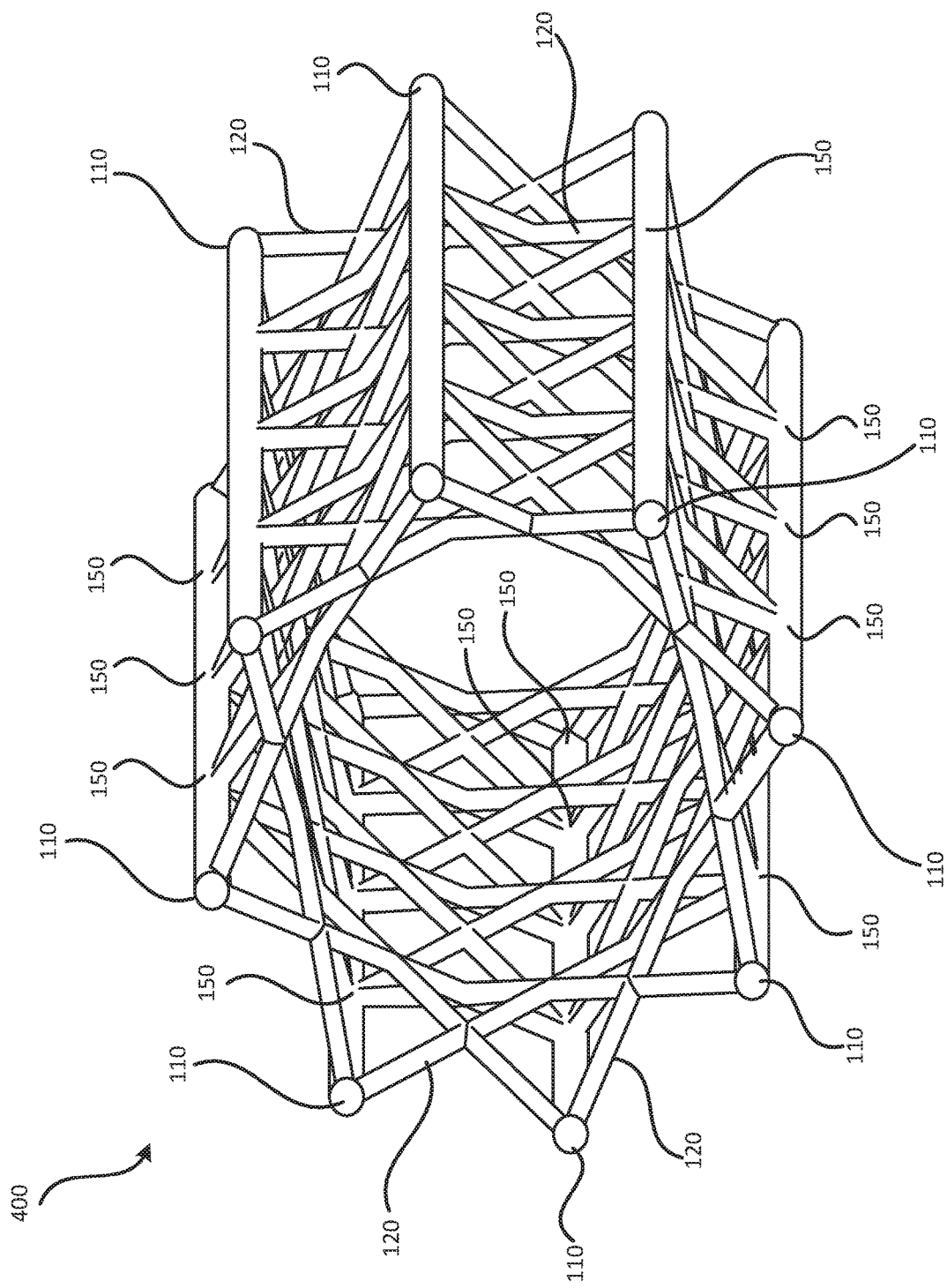
FIG. 4A is a perspective view.
Figure 4B:
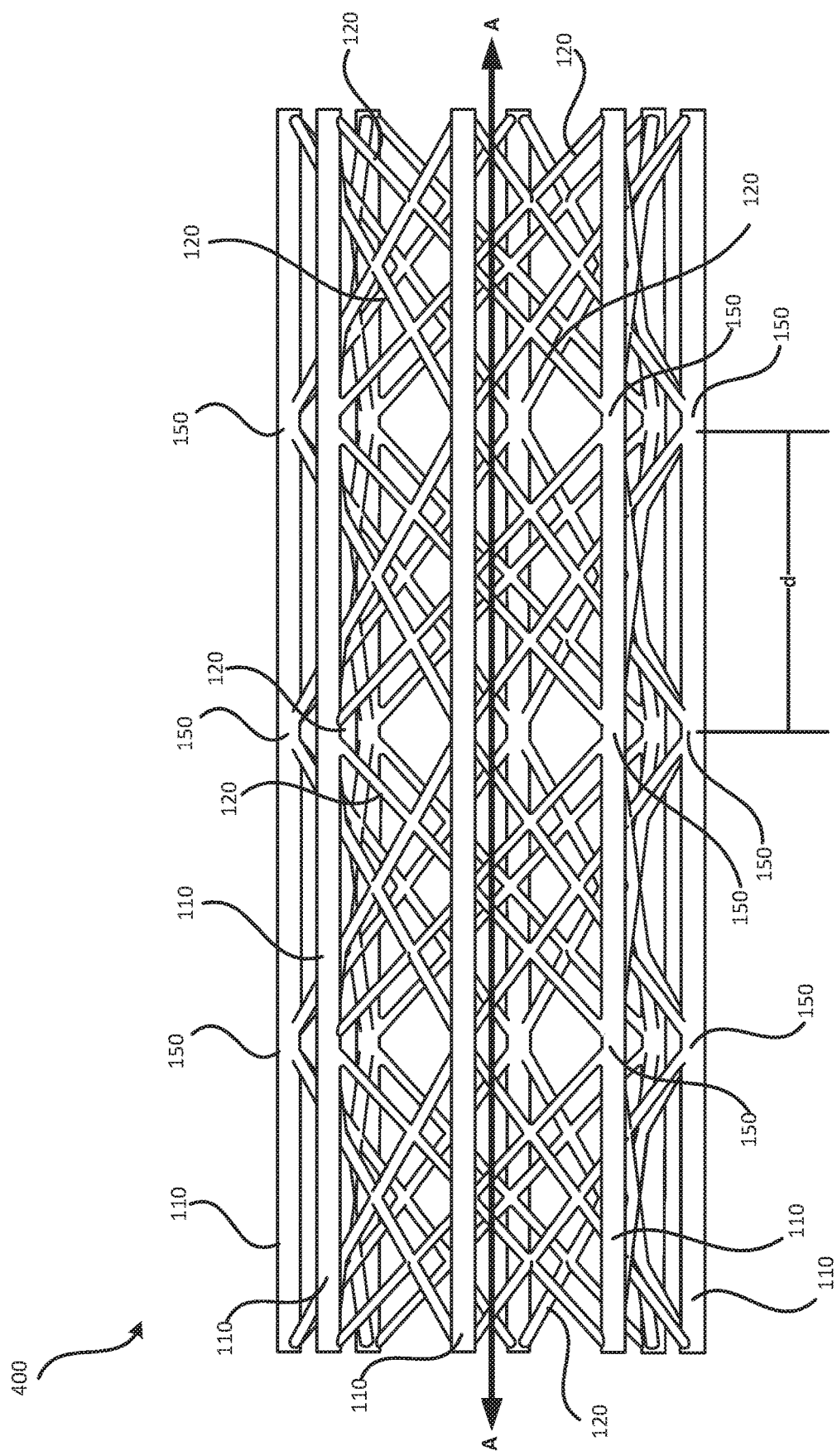
FIG. 4B is a side view.
Figure 4C:
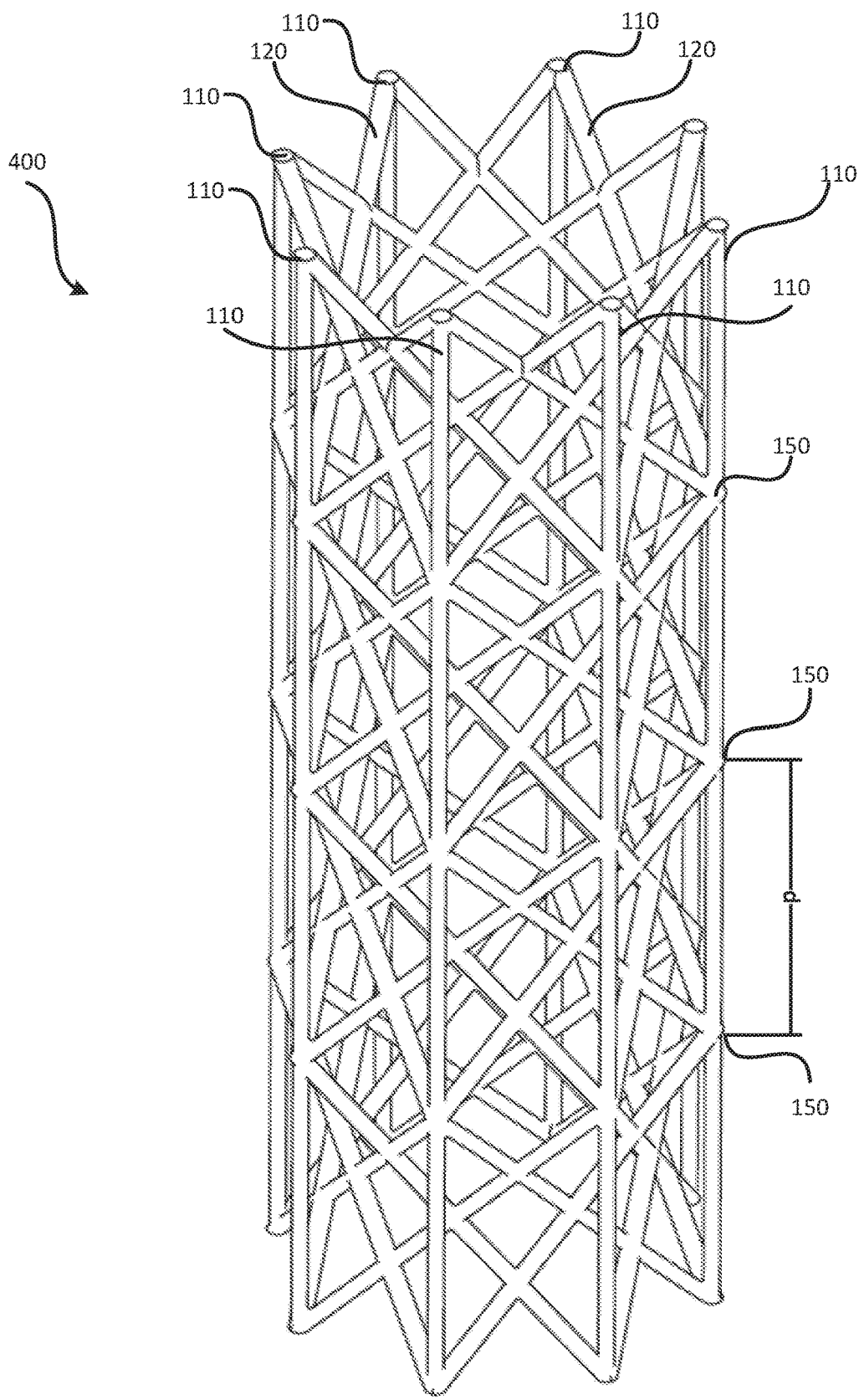
FIG. 4C is an isometric view.
Figure 4D:
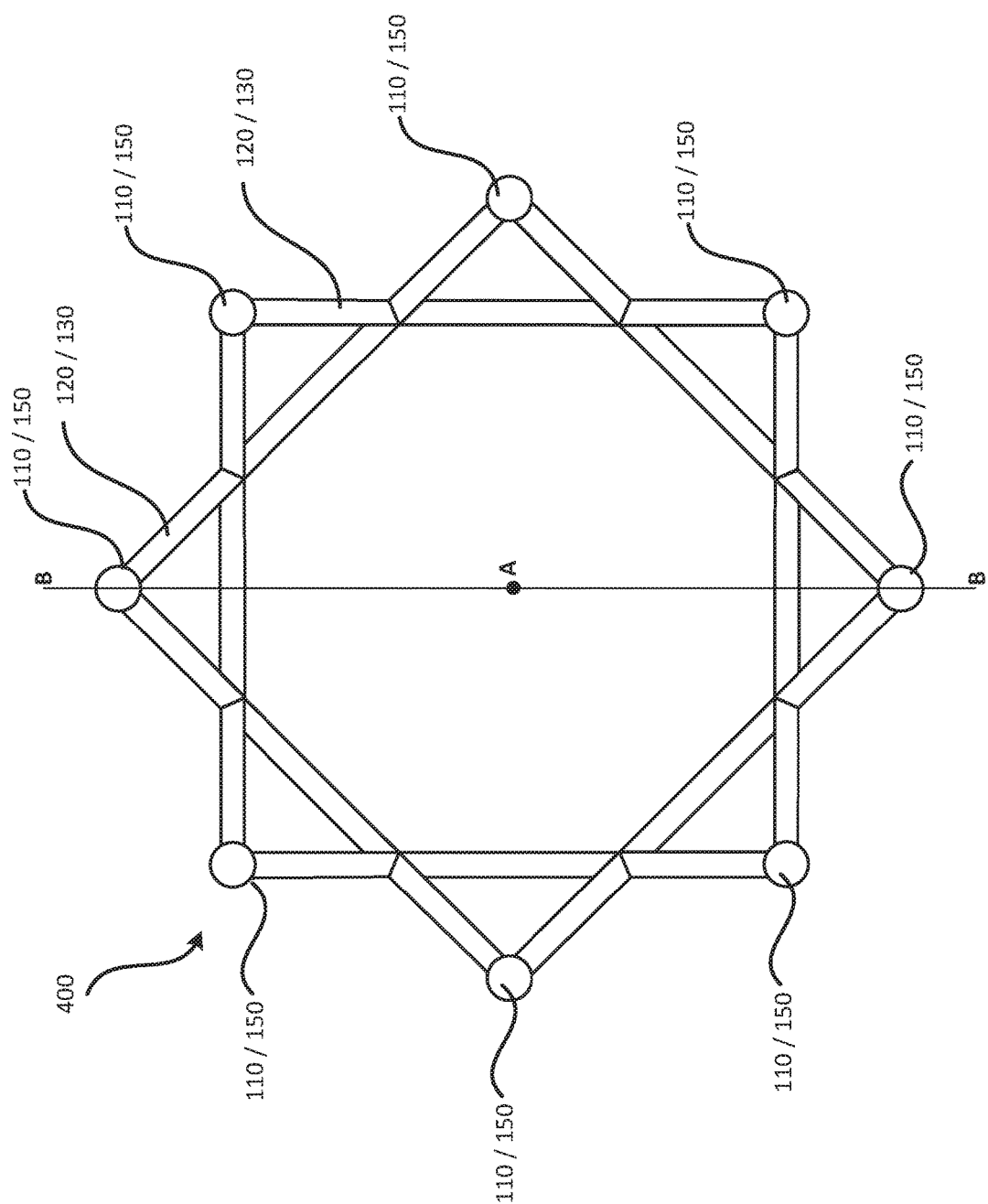
FIG. 4D is an axial end view, of an example truss structure, with longitudinal members being positioned at an outer peripheral portion of the example truss structure, in accordance with implementations described herein.

Various views of the example truss structure 200, including longitudinal members 110 having a substantially triangular cross sectional shape, are shown in FIGS. 3A-3D. FIGS. 3E and 3F provide a perspective view and an axial end view, respectively, of an example of a single longitudinal member 110 having a substantially rectangular cross section, and FIG. 3G is a cross sectional view of an example node 150 at which a longitudinal member 1120 and a transverse member 120 (of a corresponding helical structure 130) are joined. The example truss structure 200 shown in FIGS. 3A-3D includes eight longitudinal members 110, with transverse members 120 arranged end to end in helical structures 130 defining square helical sections. However, the truss structure 200 may include more, or fewer, longitudinal members 110, with the configuration of the transverse members 120 forming the helical structures 130 being adjusted accordingly.

As shown in FIGS. 3A-3E, the longitudinal members 110 having the triangular cross section may join, or intersect with, or be integrally formed with, the transverse members 120 forming the helical structures 130 at a respective plurality of nodes 150. In some implementations, the longitudinal members 110 and the transverse members 120 may be integrally joined at the nodes 150. For example, in some implementations, the longitudinal members 110 and the transverse members 120 may be made of a carbon fiber material. The carbon fiber material of the longitudinal members 110 and the transverse members 120 may include, for example, a plurality of strands that woven together to form a node 150 that integrally couples, or joins, the corresponding longitudinal member 110 and transverse member 120. For example, strands of the longitudinal member(s) 110 may be alternately arranged with the strands of the transverse member(s) 120 at the nodes 150, thus interweaving the longitudinal members 110 and the transverse members 120 at the nodes 150, and creating a substantially integral truss structure 200 from the longitudinal members 110 and the transverse members 120. In some implementations, this arrangement of the strands of the material of the longitudinal member 110 and the strands of the material of the transverse member 120 may be guided by features of a manufacturing fixture.

For example, in some implementations, the strands of the material of the longitudinal member(s) 110 and the strands of the material of the transverse members 120 may be laid up, or woven, on a manufacturing fixture 300 including grooves 320, or pockets, at points defining the nodes 150, as shown in FIG. 3F. The strands of the longitudinal member(s) 110 and the strands of the transverse member(s) 120 may be alternately arranged in these grooves in the fixture, to achieve the interweaving of the strands of the longitudinal member(s) 110 and the strands of the transverse member(s) 120, and the resulting integral structure of the truss structure 200.

An example of a method 500 of joining the longitudinal member(s) 110 and the transverse member(s) 120, or forming node(s) 150 at the intersection of the longitudinal member(s) 110 and the transverse member(s) 120 by, for example, a lay-up and/or interweaving of strands or fibers of materials of the longitudinal member(s) 110 and transverse member(s) 120, is shown in FIG. 5. In some implementations, the method 500 may include an alternating layering of the strands or fibers of a first member (for example, one of the longitudinal member 110 or the transverse member 120) with a second member (for example, the other of the longitudinal member 110 or the transverse member) in, for example, a recess or groove of a fixture.

For example, in some implementations, the method 500 may include forming a first section of the node 150 (block 510). In some implementations, the first section of the node 150 may include an interweaving of strands or fibers from the material of the first member with strands or fibers from the material of the second member. For example, the first section may include an interweaving of (a portion of) strands from the first member with (a portion of) strands from the second member. In some implementations, a second section of the node 150 may be formed adjacent to the first section of the node 150 (block 520). In some implementations, the second section may include a laying-in of (a portion of) the strands of the second member (either alone, or together with a portion of the strands of the first member) adjacent to the first section. In some implementations, a third section of the node 150 may be formed adjacent to the second section of the node 150 (block 530). In some implementations, the third section may include an interweaving of a (remaining) portion of the strands of the first member with a (remaining) portion of the strands of the second member. The layering of adjacent sections of the node 150 may include more, or fewer sections than discussed in this example, and/or different combinations of interwoven strands of the first and second members, and/or different sequencing of the strands of the first and second members. The layering of adjacent sections of the node 150 with strands of material from the first member and the second member may continue until it is determined that all of the strands of material have been incorporated into the node 150 (block 540). In some implementations, the layers or sections of material received in the recess or groove in this manner may be compressed in the recess or groove, to, for example, facilitate the reduction and/or elimination of voids. In some implementations, for example, when the material of the first member and/or the second member is pre-impregnated with an epoxy/resin material, the material received in the recess or groove in this manner may then be processed, for example, cured, to join the first member and the second member in an interwoven, or integral manner (block 550).

An example node 150, joining a longitudinal member 110 and a transverse member 120 (of one of the helical structures 130 of the truss structure 200), is shown in FIG. 3G. The example node 150 may include a first section 150A, which is formed by an interweaving of strands of material of the longitudinal member 110 and strands of material of the transverse member 120. The first section 150 of the example node 150, is illustrated by FIG. 3G by cross-hatching, to represent the interweaving of the respective strands. Various different patterns, or alternating arrangements, of strands may be implemented to accomplish this interweaving. The example node 150 may also include a second section 150B, positioned adjacent to the first section 150. In the example node 150 shown in FIG. 3G, the second section 150B of the node 150 has not yet been formed. The second section 150B may be made of the remaining strands of the material of the longitudinal member 110 and the remaining strands of material of the transverse member 120. The pattern, or arrangement of the respective strands in the second section 150B of the node 150 may be different from that of the first section 150A, or may be the same as that of the first section 150A. In some implementations, the second section 150B of the node 150 may include multiple sub-sections or layers, having multiple different arrangements of strands of the materials of the longitudinal member 110 and the transverse member 120.

In a first, non-limiting example of this type of alternating lay up of the fibers, or strands, of the longitudinal members 110 and the transverse members 120 in the groove defining the node 150 may include a weaving of approximately 25% of the strands of the longitudinal member 110 with approximately 50% of the stands of the transverse member 120, followed by approximately 50% of the strands of the longitudinal member 110, and then followed by a weaving of the remaining approximately 25% of the strands of the longitudinal member 110 with the remaining approximately 50% of the strands of the transverse member 120. This is just one example of an alternating layup of the strands of the longitudinal members 110 and the transverse members 120 in the groove defining the node 150. Other combinations of alternating carbon fiber material within the grooves of the fixture defining the nodes 150 may also be used, based on, for example, a size and/or shape and/or configuration of the truss structure 200, a type of material used for the longitudinal members 110 and/or the transverse members 120, a load to be carried by the truss structure 200, a geometric configuration of the helical structures 130, a cross sectional shape of the transverse members 120, and other such factors.

For example, in a second, non-limiting example of this type of alternating lay up of the fibers, or strands, of the longitudinal members 110 and the transverse members 120 in the groove defining the node 150 may include a relatively straightforward, consistent, repeated alternating layup, or weaving, of the strands of the longitudinal member 110 and the strands of the transverse member 120 at the node 150. This could include, for example, a layup at the node of a strand from the longitudinal member 110 followed by a strand from the transverse member 120, and then another strand from the longitudinal member 110 followed by another strand from the transverse member 120, repeating this pattern until all of the strands of the longitudinal member 110 and all of the strands of the transverse member 120 have been incorporated at the node 150. This example pattern is not necessarily limited to a repeated alternating pattern of a single strand from the longitudinal member 110, followed by a single strand from the transverse member 120. Rather, this example pattern could include a repeated alternating pattern of multiple strands from the longitudinal member 110 followed by (the same number of) multiple strands from the transverse member 120.

The first and second examples presented above may be applied in an arrangement in which, for example, a number of tows, or strands, in the helical structures 130 formed by the transverse members 120 would be half that of the longitudinal members 110. For example, the example (completed) truss structure illustrated in FIGS. 2A-2H includes eight longitudinal members 110, and sixteen helical structures 130 formed by the transverse members 120. If each of the helical structures 130 includes half the number of tows, or strands, of the longitudinal members 120, the first and second examples presented above may produce nodes 150 which incorporate all of the strands from the longitudinal members 110 and the transverse members 120 at each node 150. However, in some implementations, a third non-limiting example may include a pattern in which a ratio of longitudinal members 110 to helical structures 130 is not necessarily two to one. For example, in a truss structure which includes a three to one ratio of longitudinal members 110 to helical structures 130, a lay up pattern at the node 150 may include, for example, two strands from the helical structures 130 (one from each direction), followed by three strands from the longitudinal member 110, followed by another two strands from the helical structure 130, followed by another three strands from the longitudinal member 110, until all of the strands from the longitudinal member 110 and the helical structure 130 are incorporated at the node 150.

As noted above, these are just some examples of alternating layups of the strands of the longitudinal members 110 and the transverse members 120 forming the helical structures 130 in the groove defining the node 150. Other combinations of alternating carbon fiber material within the grooves of the fixture defining the nodes 150 may also be used, based on, for example, a size and/or shape and/or configuration of the truss structure, a type of material used for the longitudinal members 110 and/or the transverse members 120 forming the helical structures 130, a load to be carried by the truss structure, a geometric configuration of the helical structures 130, a cross sectional shape of the transverse members 120, and other such factors.

In some implementations, grooves 320 (for example, a series of grooves 320) in the manufacturing fixture 300 defining the longitudinal member(s) 110 and/or the transverse member(s) 120 and/or the nodes 150 at which the longitudinal member(s) 110 and the transverse member(s) 120 intersect, may have a V shape, as shown in the example illustrated in FIG. 3F. Layup of the fibers, or strands, of the carbon fiber material of the longitudinal member(s) 110 and the transverse member(s) 120 in the V groove 320, for example, in the manner described above, may facilitate layup of the carbon fiber material in the V groove 320, may enhance compaction, or consolidation, of the material in the V groove 320, and may produce the substantially triangular cross section shown in FIGS. 3E and 3F. In some implementations, the carbon fiber material may be pre-impregnated (pre-preg) with an epoxy resin material. Interwoven layup of the strands of pre-preg carbon fiber material in the V grooves 320 in the manner described above, having enhanced compaction in the V groove 320, followed by curing of the pre-preg carbon fiber material, may produce longitudinal member(s) 110 and/or transverse member(s) 120 and/or nodes 150 having a relatively low void ratio along the length of the truss structure 200 (i.e., the longitudinal members 110 and the transverse members 120 of the truss structure 200).

Longitudinal members 110 having a triangular cross sectional shape as described above may be produced using less material than longitudinal members 200 having other cross sectional shapes (for example, circular or rectangular/square cross sectional shapes), while providing at least equal, and in most circumstances, greater load bearing capability. The unexpected increase in load bearing capability provided by the longitudinal members 110 having the triangular cross section described above, when compared to truss structures with longitudinal members having other cross sectional shapes, is illustrated in Table 1 below. In particular, in one example, a truss structure with longitudinal members having a square cross section exhibited approximately 4.7% more load bearing capability than a comparable truss structure with longitudinal members having a circular cross section. In one example, a truss structure with longitudinal members having a triangular cross section exhibited approximately 20.9% more load bearing capability than comparable a truss structure with longitudinal members having a circular cross section. This significant, and unexpected, magnitude of improvement exhibited by the truss structure 200 with longitudinal members 110 having a triangular cross section may be due to improved local buckling resistance (buckling between two adjacent nodes 150 along a longitudinal member 110) and increased moment of inertia.

As noted above, one mode of failure of a truss structure 100 in accordance with implementations described herein may include buckling of individual longitudinal members 110. The ability of an individual longitudinal member 110 to resist bending and/or buckling may be directly proportional to an area moment of inertia of the longitudinal member 110. That is, by increasing moment of inertia, stiffness may be increased, thus reducing deflection of the truss structure under a given load. Table 1 below illustrates the difference in area moment of inertia for three different exemplary longitudinal members 110, each having a different cross sectional shape (i.e., circular, triangular, and square), holding an amount of material, of the cross sectional area, of the longitudinal members 110 constant for the three examples. As shown in Table 1, a longitudinal member having a triangular cross section may exhibit an increase in area moment of inertia of approximately 20.9% (compared to a longitudinal member 110 having a circular cross section of the same cross sectional area), affording the longitudinal member 110 having the triangular cross section an approximately 20.9% improvement in buckling strength over the longitudinal member 110 having the circular cross section. Similarly, a longitudinal member having a square cross sectional shape may exhibit an approximately 4.7% improvement in buckling resistance over a longitudinal member 110 having a circular cross section.

structures 130 have a cross sectional shape that is different than the triangular cross sectional shape of the longitudinal members 110.

Hereinafter, a truss structure 400, in accordance with implementations described herein, may include a plurality of longitudinal members 110 positioned along an outer peripheral portion of the truss structure 400, will be described with reference to FIGS. 4A-4F. Positioning of the longitudinal members 110 along the outer peripheral portion of the truss structure 400 may enhance load bearing strength of the truss structure 400 (by, for example, increasing buckling strength/resistance), and may increase moment of inertia of the truss structure 400. In particular, by positioning the longitudinal members 110 at an outer peripheral portion of the truss structure 400 (rather than, for example, an interior facing side portion of the helical structures 130), moment of inertia for the truss structure 400 may be increased. This may allow the truss structure 400 shown in FIGS. 4A-4F to carry a greater load (when compared to, for example, an interior side positioning of the longitudinal members 110 relative to the transverse members 120 of the helical structures 130), or to carry essentially the same load while utilizing less material in the manufacture of the truss structure 400. In some situations, or some arrangements of the longitudinal members 110, positioning of the longitudinal members 110 at the outer peripheral portion of the truss structure 400 in this manner may increase the moment of inertia of the truss structure 400 by as much as approximately 70%.

In the example truss structure 400 shown in FIGS. 4A-4D, the longitudinal members 110 are positioned at an outer peripheral portion of the truss structure 400, and have a circular cross sectional shape. In the example truss structure 400 shown in FIG. 4E, the longitudinal members 110 are positioned at an outer peripheral portion of the truss structure 400, and have a triangular cross sectional shape. In the example truss structure 400 shown in FIG. 4F, the longitudinal members 110 are positioned at an outer peripheral portion of the truss structure 400, and have a rectangular cross sectional shape. As noted above, the longitudinal members 110 may have other cross sectional shapes.

Regardless of the cross sectional shape of the longitudinal members 110, positioning of the longitudinal members 110 at the outer peripheral portion of the truss structure 400 may increase overall strength (for example, buckling resistance) of the truss structure 400, and may increase moment of

TABLE 1

|  | Circular | Triangular | Square |
|---|---|---|---|
| Cross sectional area (in^2) | 1 | 1 | 1 |
| Moment of Inertia (in^4) | 0.07957747155 | 0.09621333333 | 0.08333333333 |
| % difference in moment of inertia related to circular | 0 | 20.90524047 | 4.71975512 |

In the example truss structure 200 described above, the longitudinal members 110 have a triangular cross sectional shape. In some implementations, all of the longitudinal members 200 have a triangular cross sectional shape. In some implementations, some, or all, of the transverse members 120 defining the helical structures 130 have a triangular cross sectional shape. In some implementations, some, or all, of the transverse members 120 defining the helical inertia of the truss structure 400. Overall strength of the truss structure 400 may be further enhanced based on a type of material used for the longitudinal members 110 and/or the transverse members 120, as described in detail above. Overall strength of the truss structure 400 may be further enhanced by the improved compaction, and improved void ratio, afforded by the triangular cross sectional shape as described above. Increased strength of the truss structure 400 may enhance utility of the truss structure 400, provide for use of the truss structure 400 in a variety of different environments, and expand on applications for use of the truss structure 400.

In the foregoing disclosure, it will be understood that when an element, such as a layer, a region, or a substrate, is referred to as being on, connected to, or coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A three-dimensional (3D) load bearing structure, comprising:
    a transverse frame including a plurality of transverse members sequentially arranged so as to define a plurality of 3D polyhedral structures arranged in a helical pattern along a longitudinal direction of the load bearing structure; and
    a plurality of longitudinal members integrally coupled with the transverse frame, wherein
        the plurality of longitudinal members are arranged in parallel to a central longitudinal axis of the load bearing structure, and extend longitudinally along a length of the transverse frame, and
        each of the plurality of longitudinal members is integrally coupled, at a corresponding point of intersection, to a corresponding outer peripheral portion of a transverse member of the plurality of transverse members defining the plurality of 3D polyhedral structures of the transverse frame,
    wherein the integral coupling between the plurality of longitudinal members and the transverse frame includes an integral weaving of a plurality of longitudinal fibers of the plurality of longitudinal members and a plurality of transverse fibers of the plurality of transverse members at the respective points of intersection, and
    wherein a fiber pattern at each of the points of intersection includes:
        a first section including an interweaving of a first portion of the transverse fibers of the respective transverse member and a first portion of the longitudinal fibers of the respective longitudinal member;
        a second section adjacent to the first section, the second section including an arrangement of a second portion of the longitudinal fibers of the respective longitudinal member; and
        a third section adjacent to the second section, the third section including an interweaving of a second portion of the transverse fibers of the respective transverse member and a third portion of the longitudinal fibers of the respective longitudinal member.

2. The structure of claim 1, wherein each of the plurality of longitudinal members is integrally coupled to the corresponding outer peripheral portion of the respective transverse member at a point at which a contour of the plurality of transverse members of the 3D polyhedral structure changes direction.

3. The structure of claim 1, wherein each of the plurality of longitudinal members is integrally coupled to the corresponding outer peripheral portion of the respective transverse member at a point at which a contour of the plurality of transverse members of the 3D polyhedral structure forms an apex.

4. The structure of claim 1, wherein the plurality of longitudinal fibers and the plurality of transverse fibers are pre-impregnated carbon fibers.

5. The structure of claim 1, wherein the fiber pattern at each of the intersection points includes:
    the first section, including approximately 50% of the transverse fibers of the respective transverse member interwoven with approximately 25% of the longitudinal fibers of the respective longitudinal member,
    the second section adjacent to the first section, the second section including approximately 50% of the longitudinal fibers of the respective longitudinal member; and
    the third section adjacent to the second section, the third section including approximately 50% of the transverse fibers of the respective transverse member interwoven with approximately 25% of the longitudinal fibers of the respective longitudinal member.

6. The structure of claim 1, wherein
    a cross-sectional shape of each of the plurality of longitudinal members is triangular, and
    a cross-sectional shape of each of the plurality of transverse members is triangular.

7. The structure of claim 1, wherein
    a cross-sectional shape of each of the plurality of longitudinal members is substantially circular, and
    a cross-sectional shape of each of the plurality of transverse members is substantially circular.

8. The structure of claim 1, wherein the plurality of longitudinal members are arranged symmetrically about a central longitudinal plane of the load bearing structure.

9. The structure of claim 1, wherein
    each 3D polyhedral structure includes three transverse members connected end-to-end to define a triangular structure,
    the plurality of longitudinal members includes six longitudinal members extending along the longitudinal length of the load bearing structure, and in parallel to the central longitudinal axis of the load bearing structure, and the six longitudinal members intersect each of the triangular structures of each of the 3D polyhedral structures at six respective intersection points, each of the six respective intersection points being at an intersection of two adjacent transverse members.

10. The structure of claim 1, wherein each 3D polyhedral structure includes four transverse members connected end-to-end to define a rectangular structure, the plurality of longitudinal members includes eight longitudinal members extending along the longitudinal length of the load bearing structure, and in parallel to the central longitudinal axis of the load bearing structure, and the eight longitudinal members intersect each of the rectangular structures of each of the 3D polyhedral structures at eight respective intersection points, each of the eight respective intersection points being at an intersection of two adjacent transverse members.

11. The structure of claim 1, wherein a polygonal contour of each of the plurality of 3D polyhedral structures is substantially the same.

12. The structure of claim 11, wherein each 3D polyhedral structure of the plurality of 3D polyhedral structures has the same orientation about the central longitudinal axis of the load bearing structure.

* * * * *